United States Patent
Saito et al.

(10) Patent No.: US 9,163,695 B2
(45) Date of Patent: Oct. 20, 2015

(54) LIQUID-SEALED ANTI-VIBRATION DEVICE AND METHOD FOR MANUFACTURING THE SAME

(75) Inventors: Akihiro Saito, Yokohama (JP); Katsumi Someya, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 231 days.

(21) Appl. No.: 13/583,262

(22) PCT Filed: Mar. 4, 2011

(86) PCT No.: PCT/JP2011/001298
§ 371 (c)(1),
(2), (4) Date: Sep. 7, 2012

(87) PCT Pub. No.: WO2011/111354
PCT Pub. Date: Sep. 15, 2011

(65) Prior Publication Data
US 2013/0038006 A1    Feb. 14, 2013

(30) Foreign Application Priority Data

Mar. 8, 2010  (JP) .................. 2010-051032
Mar. 18, 2010 (JP) .................. 2010-063165
Apr. 13, 2010 (JP) .................. 2010-092281
Apr. 23, 2010 (JP) .................. 2010-100024

(51) Int. Cl.
*F16F 13/10* (2006.01)
*F16F 13/14* (2006.01)

(52) U.S. Cl.
CPC .......... *F16F 13/1463* (2013.01); *F16F 13/105* (2013.01); *F16F 13/107* (2013.01); *F16F 13/1445* (2013.01); *Y10T 29/49826* (2015.01)

(58) Field of Classification Search
CPC ... F16F 13/1463; F16F 13/107; F16F 13/105; F16F 13/1445
USPC ........................... 267/140.11, 140.13, 140.12
See application file for complete search history.

(56) References Cited

U.S. PATENT DOCUMENTS 4,763,884 A * 8/1988 Matsui et al. ............ 267/140.12
5,005,810 A * 4/1991 Sawada et al. ........... 267/140.13
(Continued)

FOREIGN PATENT DOCUMENTS

JP    5-26288 A    2/1993
JP    5-26570 A    2/1993
(Continued)

OTHER PUBLICATIONS

Chinese Office Action, dated May 13, 2014, issued in corresponding Chinese Patent Application No. 201180022816.9.
(Continued)

*Primary Examiner* — Thomas Irvin
(74) *Attorney, Agent, or Firm* — Sughrue Mion, PLLC

(57) ABSTRACT

A liquid-sealed anti-vibration device comprising: an inner tube (1), an outer tube (2); rubber bodies (3), (4) interconnecting the inner and outer tubes (1), (2) in a liquid-tight manner at two positions spaced in an axial direction; a partition wall disposed between the rubber bodies (3), (4) to divide a space between the inner and outer tubes into two parts in the axial direction, the partition wall having an annular rigid member (5a) and an elastic member (5b); liquid chambers (8), (9) configured in such a way that the spaces partitioned by the partition wall (5) are filled with non-compressible liquid; and a limiting passage (7) provided in the partition wall (5) to allow the liquid chambers (8), (9) to communicate with each other, wherein the annular rigid member (5a), protrudes from the inner tube (1) toward the outer tube, the elastic member (5b) connects the annular rigid member (5a) to the outer tube (2), and the limiting passage (7) is formed by at least one passage groove (5c), the passage groove being formed on the outer circumferential surface of the annular rigid member (5a) and extending at least one time around the annular rigid member, and by a circumscribed rigid tube member (6) fixed to the elastic member (5b) so as to close opening of the passage groove (5c) via a seal member (5d) in a liquid-tight manner.

13 Claims, 17 Drawing Sheets

(56) References Cited

U.S. PATENT DOCUMENTS

| | | | |
|---|---|---|---|
| 5,195,728 A * | 3/1993 | Skipper | 267/140.13 |
| 5,687,959 A * | 11/1997 | Rudolph | 267/140.12 |
| 6,557,836 B2 * | 5/2003 | Itoh | 267/140.11 |
| 6,644,633 B2 * | 11/2003 | Graeve | 267/140.12 |
| 7,219,882 B2 * | 5/2007 | Kato | 267/140.12 |
| 8,091,871 B2 * | 1/2012 | Bradshaw et al. | 267/140.13 |
| 8,297,602 B2 * | 10/2012 | Kojima et al. | 267/140.12 |
| 2003/0098534 A1 | 5/2003 | Graeve | |
| 2007/0246870 A1 | 10/2007 | Siemer et al. | |
| 2009/0026671 A1 * | 1/2009 | Kojima et al. | 267/121 |
| 2013/0069288 A1 * | 3/2013 | Saito et al. | 267/140.13 |
| 2014/0077428 A1 * | 3/2014 | Gaspar et al. | 267/140.13 |

FOREIGN PATENT DOCUMENTS

| | | | | |
|---|---|---|---|---|
| JP | 10-141425 A | 5/1998 | | |
| JP | 2003-533654 A | 11/2003 | | |
| JP | 2004-278706 A | 10/2004 | | |
| JP | 2004-340377 A | 12/2004 | | |
| JP | 2006-46555 A | 2/2006 | | |
| JP | 2007-527488 A | 9/2007 | | |
| JP | 2010-48282 A | 3/2010 | | |
| WO | 2009/100205 A1 | 8/2009 | | |
| WO | WO 2009/100205 A1 * | 8/2009 | | F16F 13/16 |
| WO | WO 2009100205 A1 * | 8/2009 | | F16F 13/16 |

OTHER PUBLICATIONS

International Search Report for PCT/JP2011/001298 dated Apr. 26, 2011.
Japanese Office Action, dated Sep. 3, 2013, issued in corresponding Japanese Patent Application No. 2010-063165.
Chinese Office Action dated Sep. 24, 2014 issued in corresponding Chinese application No. 201180022816.9.
Chinese Office Action, dated Jan. 13, 2014, issued in corresponding Chinese Patent Application No. 201180022816.9.

* cited by examiner (a)

(b)

(a)

(b)

LIQUID-SEALED ANTI-VIBRATION DEVICE AND METHOD FOR MANUFACTURING THE SAME

CROSS REFERENCE TO RELATED APPLICATIONS

This application is a National Stage of International Application No. PCT/JP2011/001298 filed Mar. 4, 2011, claiming priority based on Japanese Patent Application Nos. 2010-051032 filed Mar. 8, 2010, 2010-063165 filed Mar. 18, 2010, 2010-092281 filed Apr. 13, 2010 and 2010-100024 filed Apr. 23, 2010, the contents of all of which are incorporated herein by reference in their entirety.

TECHNICAL FIELD

The present invention relates to a so-called differential type liquid-sealed anti-vibration device with a high vibration-damping performance suitable for use as a cabin mount and a method for manufacturing the same. The invention particularly proposes a technology for a liquid-sealed anti-vibration device capable of achieving an excellent vibration-damping function over a long period of time as desired, which device is provided with a passage groove for a limiting passage with a large cross-sectional area in a rigid annular member contributing to a formation of a partition wall, by effectively preventing unwanted deforming, damaging and the like of the passage groove, and hence of the limiting passage formed by the passage groove.

BACKGROUND ART

Conventional anti-vibration devices of this type are disclosed in Patent Documents 1-5. Patent Document 1 discloses "a liquid-sealed mount comprising an inner circumferential tube and an outer circumferential tube interconnected by a spring member and a diaphragm made of elastomer, liquid chambers defined by a partition wall arranged between the spring member and the diaphragm, and a limiting flow passage formed in the partition wall for communication between the liquid chambers, wherein the inner circumferential tube is provided with a window section facing the first liquid chamber, and the window section is sealed by an elastic membrane 14 made of elastomer." Accordingly, "without a complicated structure, at the lower frequency range, the dynamic spring coefficient is increased due to the flow resistance of the operating liquid flowing through the limiting flow passage, and thereby an excellent vibration-damping ability may be achieved, while at the higher frequency range, the operating liquid does not flow through the limiting flow passage, the dynamic spring coefficient is decreased, and thereby an excellent vibration-absorbing effect may be achieved."

PATENT DOCUMENTS

Patent Document 1: JP 5-026570 U
Patent Document 2: WO 2009/100205 A1
Patent Document 3: JP 5-026288 A
Patent Document 4: JP 2004-278706 A
Patent Document 5: JP 2004-340377 A

SUMMARY OF THE INVENTION

Problem to be Solved by the Invention

However, the liquid-sealed anti-vibration device disclosed in Patent Document 1 is of a so-called differential pressure type wherein one of the liquid chambers is defined by a diaphragm, and the diaphragm deforms elastically away from the one of the liquid chambers as the inner pressure of the one of the chambers increases. Accordingly, there is a drawback that the inner pressure of the one of the liquid chambers cannot be sufficiently enhanced, thereby the amount of the flow of the operating liquid through the limiting flow passage naturally decreases, and hence a high vibration-damping ability cannot be achieved.

Further, in Patent Document 1, since the limiting flow passage formed in the partition wall has a short total length and a small cross-sectional area, a sufficient vibration-damping function cannot be achieved. Moreover, since the flow passage faces the outer circumferential tube to which vibration or the like is directly applied, there is drawbacks that burrs which is formed when the outer circumferential tube is press-fitted during the assembling of the device may enter the flow passage, and that burrs which is formed as the device is in use may enter the flow passage, and thereby a required damping performance cannot be achieved.

The present invention aims to solve the aforementioned drawbacks of the conventional device disclosed in Patent Document 1. The main object of the present invention is to provide a liquid-sealed anti-vibration device of a differential type and a method for manufacturing the same, wherein the deformation of a rubber body, which contributes to the formation of the liquid chambers, away from a liquid chamber is sufficiently prevented, and a passage groove is formed on the outer circumferential surface or the inner circumferential surface of an annular rigid member so as to extend at least one time around the annular rigid member, thereby the length of the limiting passage formed in the partition wall is sufficiently long, and an excellent vibration-damping function is sufficiently ensured, and wherein the cross-sectional area of the flow passage is sufficiently large, so that, even burrs enter the limiting passage for example, a constant damping function is sufficiently achieved.

Another object of the present invention is to provide a liquid-sealed anti-vibration device and a method for manufacturing the same which, in a case where the limiting passage is formed by subjecting the rigid tube member to plastic deformation so as to cap the passage groove, or in a case where a torsion force or the like is exerted on the limiting passage of the anti-vibration device due to a force applied to the device, can effectively prevent the deforming, damaging and the like of the passage groove formed in the annular rigid member and hence of the limiting passage.

Means for Solving the Problem

A liquid-sealed anti-vibration device according to the present invention comprises: an inner tube; an outer tube; rubber bodies interconnecting the inner and outer tubes in a liquid-tight manner at two positions spaced in an axial direction; a partition wall disposed between the rubber bodies to divide a space between the inner and outer tubes into two parts in the axial direction, the partition wall having an annular rigid member and an elastic member; liquid chambers configured in such a way that the spaces defined by the partition wall are filled with non-compressible liquid; and a limiting passage provided in the partition wall to allow the liquid chambers to communicate with each other, wherein the annular rigid member protrudes from the inner tube toward the outer tube or from the outer tube toward the inner tube;

the elastic member connects the annular rigid member to either the outer tube or the inner tube that is on the opposite side of the side where the annular rigid member is mounted; and the limiting passage is formed by at least one passage groove, the passage groove being formed on a surface of the annular rigid member on a protruding side of the annular rigid member and extending at least one time around the annular rigid member, and by either a circumscribed rigid tube member or an inscribed rigid tube member fixed to the elastic member to close an opening of the passage groove via a seal member in a liquid-tight manner, for example by means of plastic deformation by swaging. Herein, the term "rigid" used in the description and the claims means that the member is made of a metallic material such as iron, steel and aluminum or a non-metallic rigid material such as plastic.

Preferably, in the anti-vibration device, the circumscribed rigid tube member or the inscribed rigid tube member closing the opening of the passage groove of the limiting passage has an upper-end inward flange or an upper-end outward flange engaging with an upper-surface edge section of the annular rigid member over a width larger than a groove depth of the passage groove and a lower-end section of the circumscribed rigid tube member or the inscribed rigid tube member has an inward-flange inclined surface or an outward-flange tapered surface formed by drawing or diameter-enlarging of the tube member for example, and facing obliquely upward and engaging with a tapered surface or an inclined surface which faces obliquely downward and is provided on an outer circumferential surface or an inner circumferential surface of a lower-end section of the annular rigid member.

Preferably, the seal member comprises a lining layer of the elastic member disposed on an inner circumferential surface of the circumscribed rigid tube member or on an outer circumferential surface of the inscribed rigid tube member, i.e. a lining layer formed of the same material as the elastic member which contributes to forming the partition wall.

In a case where the partition wall has the annular rigid member protruding from the inner tube toward the outer tube; the circumscribed rigid tube member which caps the passage groove formed on an outer circumferential surface of the annular rigid member in a liquid-tight manner and sandwiches and secures the annular rigid member between inward flanges respectively disposed on axially-opposite end portions of the circumscribed rigid tube member; and the elastic member connecting the circumscribed rigid tube member to the outer tube, and where the limiting passage of the partition wall is formed by the passage groove formed on the outer circumferential surface of the annular rigid member and by the circumscribed rigid tube member closing the opening of the passage groove via the seal member in a liquid-tight manner, it is preferable that the limiting passage opens to at least one of the liquid chambers via a through hole formed in the annular rigid member, the through hole extending in the axial direction and extending on an outer circumferential side thereof.

Preferably, the aforementioned through hole is formed by at least one recess and a radial hole extending circumferentially outwardly from the recess, wherein the recess is provided on an end surface of the annular rigid member on the side of the at least one liquid chambers, is disposed radially inward of the limiting passage, and extends in the axial direction. In this case, preferably, the annular rigid member of the partition wall frictionally engages with an outer circumferential surface of the inner tube, a diameter of the outer circumferential surface of the inner tube is made smaller via a flat-surfaced step at a portion where the partition wall is fitted to, the flat-surfaced step extending perpendicularly to a central axis of the inner tube, and a section of the end surface of the annular rigid member is abutted on the step of the inner tube, the section being located radially inward of the recess.

In a case where one of the rubber bodies is fixed to an outer circumferential surface of the inner tube, which is formed of a rigid material, on one end side of the inner tube, an inner-tube sleeve, which is formed of a rigid material, is fitted to the outer circumferential surface of the inner tube on the other end side of the inner tube, the other rubber body is connected to the inner tube via the inner-tube sleeve, and the annular rigid member protruding from the inner tube toward the outer tube is fitted to the outer circumferential surface of the inner tube, it is preferable that an outer diameter of the inner tube is made smaller via a flat-surfaced step at a portion where the annular rigid member is fitted to, than at a portion where the one of the rubber bodies is fixed to, the flat-surfaced step extending perpendicularly to a central axis of the inner tube, the outer diameter of the inner tube is made further smaller via a step at portion where the inner-tube sleeve is fitted to, and an inner circumferential surface of the annular rigid member has a tapered shape, such that a diameter of the inner circumferential surface of the annular rigid member gradually increases toward the one end of the inner tube at least along an end portion of the annular rigid member on the side of the one end of the inner tube, and an inner circumferential surface of the annular rigid member frictionally engages with an outer circumferential surface of the inner tube.

Preferably, a portion of the annular rigid member on the side of the inner-tube sleeve is formed with a thin-walled section having an outer diameter that is smaller than an outer diameter of the other portion of the annular rigid member, a portion of the annular rigid member other than the thin-walled section is provided with the limiting passage, and the annular rigid member frictionally engages with the outer circumferential surface of the inner tube, mainly at the thin-walled section. Preferably, an end surface of the annular rigid member on the side of the one end of the inner tube is formed with an annular recess dented in a direction toward the inner-tube sleeveover an entire circumference, and the limiting passage is disposed circumferentially outward of the annular recess.

In a case where at least one of the rubber bodies is connected to an outer circumferential surface of the inner tube via the inner-tube sleeve, it is preferable that a diameter of an end portion of the inner-tube sleeve on the side of the partition wall is enlarged compared to a diameter of the other portion of the inner-tube sleeve, an annular elastic member is provided between the enlarged-diameter portion and the inner tube, the annular elastic member having a protruding section toward the partition wall and being integral with the one of the rubber bodies, the inner-tube sleeve frictionally engages with the outer circumferential surface of the inner tube, and the protruding section of the annular elastic member is compressed by at least one of the step provided on the outer circumferential surface of the inner tube and a portion consisting of the annular rigid member of the partition wall.

Preferably, the annular elastic member is provided with a recess disposed circumferentially outwardly or circumferentially inward of the protruding section over an entire circumference. Preferably, a tip of the end portion of the inner-tube sleeve with the enlarged diameter is provided with a plurality of cutout portions, the one of the rubber bodies and the annular elastic member being integrally connected with each other via the cutout portions, and portions of the tip of the inner-tube sleeve other than the cutout portions are abutted on at least one of the step of the inner tube and the annular rigid member of the partition wall.

According to the present invention, there is also provided a method for manufacturing a liquid-sealed anti-vibration device having an inner tube, an outer tube, rubber bodies interconnecting the inner and outer tubes in a liquid-tight manner at two positions spaced in an axial direction, a partition wall disposed between the rubber bodies to divide a space between the inner and outer tubes into two parts in the axial direction, the partition wall having an annular rigid member and an elastic member, liquid chambers configured in such a way that the spaces defined by the partition wall are filled with non-compressible liquid, and a limiting passage provided in the partition wall to allow the liquid chambers to communicate with each other, the method comprising:

mounting the annular rigid member for the partition wall around the inner tube;

capping a passage groove formed on an outer circumferential surface of the annular rigid member by a circumscribed rigid tube member via a seal member, such that an upper-end inward flange of the circumscribed rigid tube engages with an upper-surface edge section of the annular rigid member over a width larger than a groove depth of the passage groove, the circumscribed rigid tube member being connected to the outer-tube side and being fixed to an inner circumferential portion of the elastic member, and a lower-end section of the circumscribed rigid tube member is subjected to plastic deformation to be aligned with a tapered surface facing obliquely downward which is provided on an outer circumferential surface of a lower end of the annular rigid member so that the lower-end section engages with the tapered surface of the annular rigid member by an inward-flange inclined surface thereof.

Effect of the Invention

According to the present invention, the thickness of each of the rubber bodies spaced from each other is configured so as to effectively prevent the deformation of the rubber body even at a higher inner pressure of the liquid chamber, thereby a high vibration-damping function can be positively achieved. Moreover, since the limiting passage has a long length, the cross-sectional area of the flow passage is sufficiently large, and thereby it is possible to effectively damp particularly lower-frequency vibration.

Since the opening of the passage groove of the annular rigid member is closed by the rigid tube member in a liquid-tight manner via the seal member, it is possible to effectively prevent unwanted leakage, bypass flow or the like of the liquid inside the limiting passage. Therefore, according to the liquid column resonance of the liquid inside the limiting passage, the flow resistance of the liquid flow through the limiting passage or the like, a desired vibration-damping function can be achieved.

In a case where the device is configured in such a way that: the limiting passage is formed by subjecting the rigid tube member to plastic deformation so as to cap the passage groove of the annular rigid member for the partition wall, the circumscribed rigid tube member or the inscribed rigid tube member for closing the opening of the passage groove has an upper-end inward flange or an upper-end outward flange engaging with an upper-surface edge section of the annular rigid member over a width larger than a groove depth of the passage groove and being formed by drawing or diameter-enlarging of the tube member for example; and a lower-end section of the circumscribed rigid tube member or the inscribed rigid tube member has an inward-flange inclined surface or an outward-flange tapered surface facing obliquely upward and engaging with a tapered surface or an inclined surface provided on an outer circumferential surface or an inner circumferential surface of a lower-end section of the annular rigid member, the tapered surface or the inclined surface facing obliquely downward, it is possible to sufficiently reduce the force applied in the compression direction to the portion of the annular rigid member where the passage groove is formed at the time of forming the inward-flange inclined surface or the outward-flange tapered surface facing upward at the lower-end section of the rigid tube member by means of plastic deformation. Therefore, the damaging of the limiting passage can be prevented, and the required size of the limiting passage can be always achieved.

Similarly, in a case where a torsion force or the like is exerted on the annular rigid member of the manufactured liquid-sealed anti-vibration device via the rigid tube member, since the upper-end flange of the rigid tube member engages with the upper-surface edge section of the annular rigid member over a large area, while the lower-end flange of the rigid tube member engages with the obliquely-downward tapered surface or inclined surface of the lower-end section of the annular rigid member, it is possible to sufficiently mitigate the input of the torsion force or the like to the portion of the annular rigid member where the limiting passage is formed, and the desired size of the limiting passage can always be achieved.

In a case where the liquid-sealed anti-vibration device is configured in such a way that the seal member comprises a lining layer of the elastic member, the lining layer being disposed on an inner circumferential surface of the circumscribed rigid tube member or on an outer circumferential surface of the inscribed rigid tube member, the lining layer can be molded simultaneously with the molding of the elastic member of the partition wall to eliminate a separate process for forming the seal member.

In a case where the limiting passage opens to at least one of the liquid chambers via a through hole formed in the annular rigid member so as to eliminate a lower rigidity section from the axial-end section of the annular rigid member, the through hole extending in the axial direction and extending on an outer circumferential side of the annular rigid member, it is possible to effectively prevent the deforming, damaging and the like of the end section of the annular rigid member, and hence of the passage groove, due to the force exerted by the inward flange of the circumscribed rigid tube member as a torsion force is applied to the anti-vibration device. Moreover, it is possible to effectively protect the end section of the annular rigid member against the input in the axis direction to the annular rigid member as the circumscribed rigid tube member is subjected to plastic deformation. Accordingly, a desired liquid flow through the limiting passage can be constantly achieved, and the anti-vibration device can achieve a desired vibration-damping function over a long period of time.

In a case where the limiting passage opens to a liquid chamber via a recess and a radial hole of the annular rigid member, the recess being disposed radially inward of the limiting passage and extending in the axial direction, the radial hole extending circumferentially outwardly from the recess, there exists a rigid region at circumferentially inward of the recess of the annular rigid member and adjacent to the inner tube. Therefore, if the recess extends over an entire circumference of the annular rigid member, it is advantageous that, for example, the annular rigid member is provided with a reinforcement portion partially bridging between an innercircumferential-side region and an outer-circumferential-side region partitioned in the radial direction by the recess, so that the strength of the annular rigid member may be sufficiently high for the time when the device is being manufactured or against the force applied to the device as the device is in use. As a result, it is possible to further effectively reduce the deformation of the passage groove formed on the outer circumferential surface of the annular rigid member, hence the deformation of the limiting passage formed by capping the passage groove by means of the circumscribed rigid tube member. Accordingly, the device may achieve a desired vibration damping performance.

In a case where the anti-vibration device is manufactured in such a way that the annular rigid member, which forms the inner-circumferential-side portion of the partition wall, is fitted to the inner tube formed of a rigid material from an end of the inner tube for frictional engagement with the outer circumferential surface of the inner tube, it is preferable, for easier mounting of the annular rigid member onto the partition wall, that the outer circumferential surface of the inner tube has a flat-surfaced step extending perpendicularly to the central axis of the inner tube, such that the diameter of the outer circumferential surface of the inner tube is made smaller via the step at a portion where the partition wall is fitted to, and that an end surface of the annular rigid member is abutted on the step so as to position the annular rigid member. However, if the device is manufactured in this way, there is a risk of the deformation of the annular rigid member, hence the deformation of the passage groove, as the annular rigid member frictionally engages with the outer circumferential surface of the inner tube or abuts on the step of the inner tube, due to the press-in force required for fitting the annular rigid member.

In a case where a section of the end surface of the annular rigid member is abutted on the step of the inner tube, the section being located radially inward of the recess, the recess extending from the end surface of the annular rigid member in the axis direction allows the force exerted on the annular rigid member to escape as the annular rigid member frictionally engages with the outer circumferential surface of the inner tube and abuts on the step of the inner tube. Therefore it is possible to reduce the transmission of the force to the portion of the annular rigid member adjacent to the passage groove, and thereby to further effectively prevent the deformation of the limiting passage.

As mentioned above, in a case where the inner circumferential surface of the annular rigid member has a tapered shape, such that a diameter of the inner circumferential surface of the annular rigid member gradually increases toward an end of the inner tube at least along an end portion of the annular rigid member on the side of the one end of the inner tube, and the inner circumferential surface of the annular rigid member of the partition wall frictionally engages with the outer circumferential surface of the inner tube, it is possible to further reduce the press-in force required to fit the annular rigid member during the assembling of the members. Therefore, the deformation of the limiting passage of the annular rigid member due to the press-in force may be reduced, and thereby the manufactured anti-vibration device can achieve a desired vibration-damping characteristic.

In a case where a portion of the annular rigid member on the side of the inner-tube sleeve is formed with a thin-walled section having an outer diameter that is smaller than an outer diameter of the other portion of the annular rigid member, the portion of the annular rigid member other than the thin-walled section is provided with the limiting passage, and the annular rigid member frictionally engages with the outer circumferential surface of the inner tube mainly at the thin-walled section, the portion of the annular rigid member other than the thin-walled section, that is provided with the limiting passage, is barely subjected to the press-in force at the time of fitting the annular rigid member. Accordingly, the deforming force applied to the limiting passage can be further reduced to effectively prevent the degradation of the performance of the anti-vibration device due to the deformation of the limiting passage.

In a case where the end surface of the annular rigid member on the side of the one end of the inner tube is formed with an annular recess dented in a direction toward the inner-tube sleeve, the annular recess extending along an entire circumference, and the limiting passage is disposed circumferentially outward of the annular recess, the press-in force required to fit the annular rigid member is not transmitted to the limiting passage for the presence of the annular recess disposed circumferentially inward of the limiting passage. Accordingly, the deformation of the limiting passage of the annular rigid member can be further reduced, and the anti-vibration device can be lighter in weight.

In a case where the protruding section of the annular elastic member is compressed by at least one of the step of the inner tube and the rigid portion of the partition wall, while the annular rigid member is located inward of the diameter-enlarged portion of the inner-tube sleeve, the gap between the inner tube and the inner-tube sleeve can be sufficiently closed in a liquid-tight manner by the compressed annular elastic member, and, as the inner-tube sleeve is pressed-in to the inner tube, the annular elastic member is not rubbed onto the outer circumferential surface of the inner tube. Accordingly, there is no risk of the occurrence of rubber burrs on the annular elastic member, or the abrasion of the annular elastic member, and therefore it is possible to effectively prevent the leakage of the liquid sealed inside as the device is in use. Further, the portion of the inner-tube sleeve other than the enlarged-diameter portion can frictionally engage directly with the outer circumferential surface of the inner tube without the intervention of the elastic member. Accordingly, the inner-tube sleeve can be connected to the inner tube in a sufficiently tight manner. As a result, the device can achieve a desired vibration damping performance.

Since the anti-vibration device is configured in such a way that the annular elastic member that is disposed between the enlarged-diameter portion of the inner-tube sleeve and the inner tube is integrally formed with the rubber body located at the outer circumferential side of the inner-tube sleeve, there is no need to preliminarily prepare a separate annular elastic member, and thereby it is possible to eliminate the risk of increasing the number of members, mounting steps, or the like, and hence the risk of increasing the manufacturing cost.

In a case where the annular elastic member is provided with a recess disposed either circumferentially outwardly or circumferentially inward of the protruding section of the annular elastic member, the recess extending along an entire circumference, the protruding section deforms toward the recess on the outer circumferential side or inner circumferential side, as the protruding section is compressed by at least one of the step of the inner tube and the rigid portion of the partition wall. Accordingly, the filling ratio of the annular elastic member filling the space between the inner tube and the enlarged-diameter portion of the inner-tube sleeve can be enhanced, and therefore the sealed-liquid can be further hermetically sealed.

In a case where the portions of the tip of the inner-tube sleeve other than the cutout portions are abutted on at least one of the step of the inner tube and the rigid portion of the partition wall, it is possible to positively position the inner-tube sleeve with respect to the rigid member of the partition wall or the like at the time of mounting the inner-tube sleeve. Moreover, it is possible to prevent the displacement of the inner-tube sleeve, hence the displacement of the rubber body mounted to the outer circumferential surface of the inner-tube sleeve, with respect to the inner tube, as the device is in use. Accordingly, the device can constantly achieve a desired vibration-damping performance.

The manufacturing method according to the present invention comprises mounting the annular rigid member for the partition wall around the inner tube; capping a passage groove formed on an outer circumferential surface of the annular rigid member by a circumscribed rigid tube member via a seal member, such that an upper-end inward flange of the circumscribed rigid tube engages with an upper-surface edge section of the annular rigid member over a width longer than a groove depth of the passage groove, the circumscribed rigid tube member being connected to the outer tube side and being fixed to an inner circumferential portion of the elastic member, and a lower-end section of the circumscribed rigid tube member is subjected to plastic deformation so as to be aligned with a tapered surface facing obliquely downward which is provided on an outer circumferential surface of a lower-end section of the annular rigid member such that the inward-flange inclined surface provided on the lower end section of the circumscribed rigid tube member engages with the tapered surface of the annular rigid member, the inward-flange inclined surface facing obliquely upward. Accordingly, as the lower end section of the rigid tube member is subjected to plastic deformation, the tapered surface of the annular rigid member is subjected to an obliquely upward force in the direction perpendicular to the tapered surface. Therefore, even if the passage groove on the outer circumferential surface of the annular rigid member is located in the proximity of the lower end section of the annular rigid member, it is possible to sufficiently prevent the input of a large force to the portion of the annular rigid member where the passage groove is formed, and thus to effectively eliminate the risk of the unwanted size change of the passage groove, and hence of the limiting passage.

On the other hand, the upper-end inward flange of the rigid tube member engages with the upper-surface edge section of the annular rigid member over a sufficiently large area. Accordingly, even if the upper-end inward flange exerts a downward force on the annular rigid member as the lower end section of the rigid tube member is subjected to plastic deformation, the downward force is widely dispersed over the upper surface of the annular rigid member. Therefore it is possible to effectively protect the passage groove from deformation.

Similarly, if a force in the torsional direction is applied between the inner and outer tubes, and thereby a torsion force is applied between the annular rigid member and the rigid tube member, the inward flange of the lower end section of the rigid tube member exerts an obliquely upward force on the lower end section of the annular rigid member. The force exerted by the upper-end inward flange of the rigid tube member and applied to the upper surface of the annular rigid member is sufficiently dispersed over a wide region. Therefore the passage groove provided on the outer circumferential surface of the annular rigid member is sufficiently protected from the deformation due to the forces exerted by the lower-end inward flange and the upper-end inward flange of the rigid tube member.

BEST MODE FOR CARRYING OUT THE INVENTION

Figure 1:
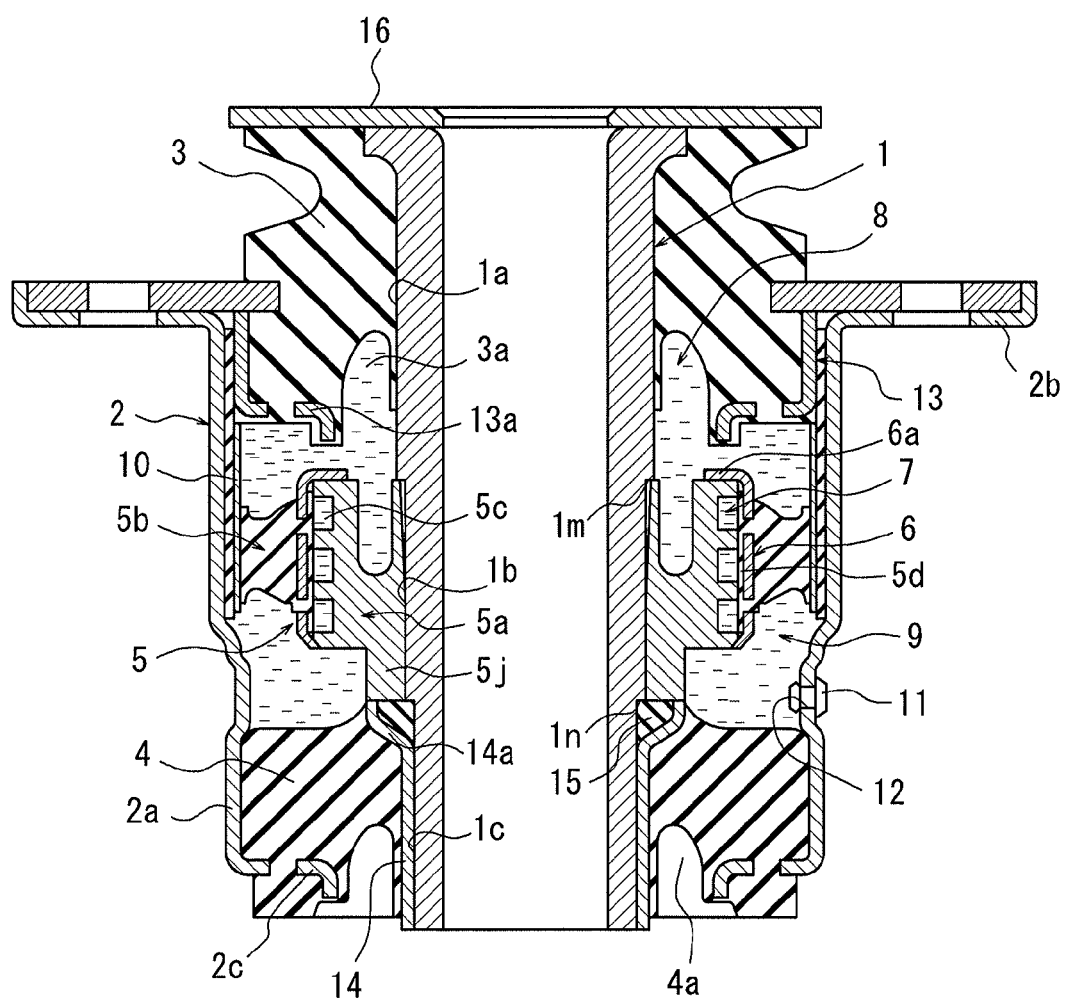
FIG. 1 is a sectional view along a central axis showing an embodiment of the present invention.

Referring to an embodiment shown in FIG. 1, the numeral 1 denotes an inner tube which is provided with a flange at the upper end as shown. The inner tube 1 may be made of metal and is often cylindrical. The numeral 2 denotes an outer tube which is spaced circumferentially outward from the inner tube 1 and is provided with an upper-end flange. The outer tube 2 is also often cylindrical and may be made of metal.

The inner and outer tubes 1, 2 are connected with each other in a liquid-tight manner by a rubber body 3 at the upper end as shown and by a rubber body 4 at the lower end as shown. The rubber bodies 3, 4 are spaced from each other in an axial direction of the inner and outer tubes 1, 2 and are disposed between the inner and outer tubes 1, 2. The space defined by the inner and outer tubes 1, 2 and the rubber bodies 3, 4 is divided into two air chambers by a partition wall 5. The partition wall 5 is connected to each of the inner and outer tubes 1, 2 at an intermediate section in the axial direction of the inner and outer tubes 1, 2 and has an annular rigid member and an elastic member.

In the example shown in FIG. 1, the partition wall 5 is assembled in such a way that the annular rigid member 5a, which is formed of an aluminum or resin molded body or the like, is mounted around the inner tube 1 in a liquid-tight manner by means of press-fitting or the like, and subsequently the annular rigid member 5a is connected to the outer tube 2 via the elastic member 5b. Alternatively, each of the annular rigid member and the elastic member of the partition wall 5 may be mounted on the outer-tube side and on the inner-tube side respectively in a liquid-tight manner.

As shown in FIG. 1, a limiting passage 7 is formed in such a way that at least one passage groove 5c is closed in a liquid-tight manner by a circumscribed rigid tube member 6 via a seal member 5d. The passage groove 5c is formed on the outer circumferential surface of the annular rigid member 5a and extends at least one time around the annular rigid member 5a. The circumscribed rigid tube member 6 is fixed to the inner circumferential side of the elastic member 5b by means of vulcanized adhesion or the like. The seal member 5 may be a rubber-lining layer which may be formed of the same type of rubber material as the elastic member 5b. The limiting passage 7 serves to allow liquid chambers 8, 9 to communicate with each other, which are formed in such a way that the two air chambers divided by the partition wall 5 are filled with non-compressible required liquid and the liquid is sealed therein.

Figure 2:
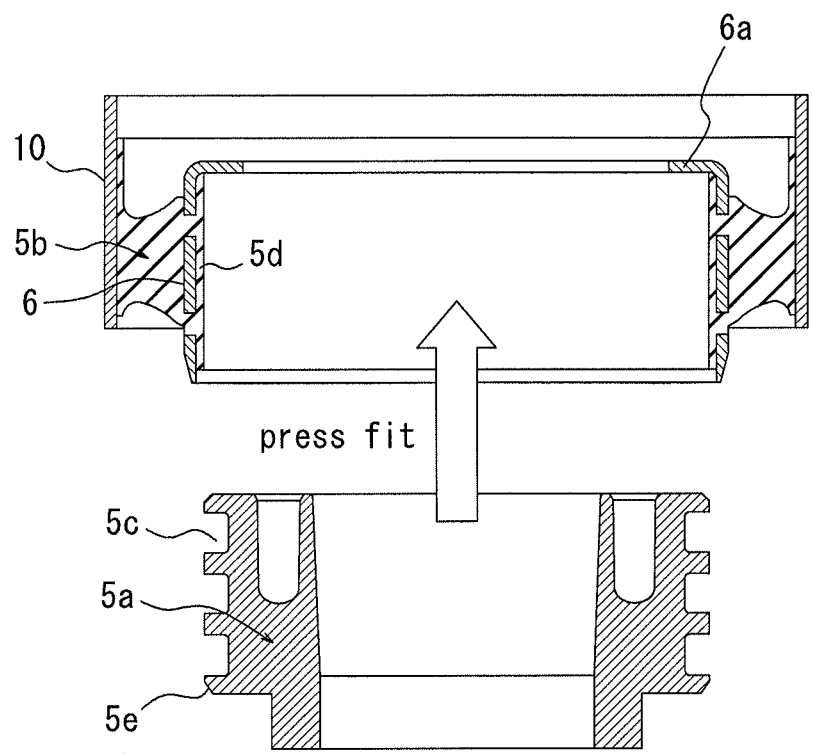
FIG. 2 is an exploded sectional view illustrating the component members of a partition wall.

As shown in an exploded state in FIG. 2, the partition wall 5 as shown has the annular rigid member 5a and the elastic member 5b. The outer circumferential surface of the annular rigid member 5a is formed with the passage groove 5c extending, for example, helically at least one time around the annular rigid member 5a. Each of the circumscribed rigid tube member 6 and a support tube 10 is fixed to the elastic member 5b at the inner circumferential side and the outer circumferential side thereof respectively by means of vulcanized adhesion or the like. These component members of the partition wall may be assembled into the partition wall 5 in such a way that the annular rigid member 5a is press-fitted to the inside of the circumscribed rigid tube member 6 via the seal member 5d, the upper surface of the annular rigid member 5a as shown is abutted on the upper-end inward flange 6a of the rigid tube member 6, and subsequently the lower-end section of the rigid tube member 6 is subjected to plastic deformation by means of drawing or the like, such that the lower-end section of the rigid tube member 6 is aligned with a tapered surface 5e provided on the outer circumferential surface of the lower-end section of the annular rigid member 5a, the tapered surface 5e facing obliquely downward, while an inward-flange inclined surface provided on the lower-end section of the rigid tube member 6 engages with the tapered surface 5e of the annular rigid member 5a, the inward-flange inclined surface facing obliquely upward. In this case, the upper-end inward flange 6a of the circumscribed rigid tube member 6 preferably engages with the upper surface of the annular rigid member 5a over a width larger than the groove depth of the passage groove 5c. This allows the force applied to the inward flange 6a to be widely dispersed over the annular rigid member 5a, thereby preventing the deformation and the like of the passage groove 5c or of the limiting passage 7.

Figure 3:
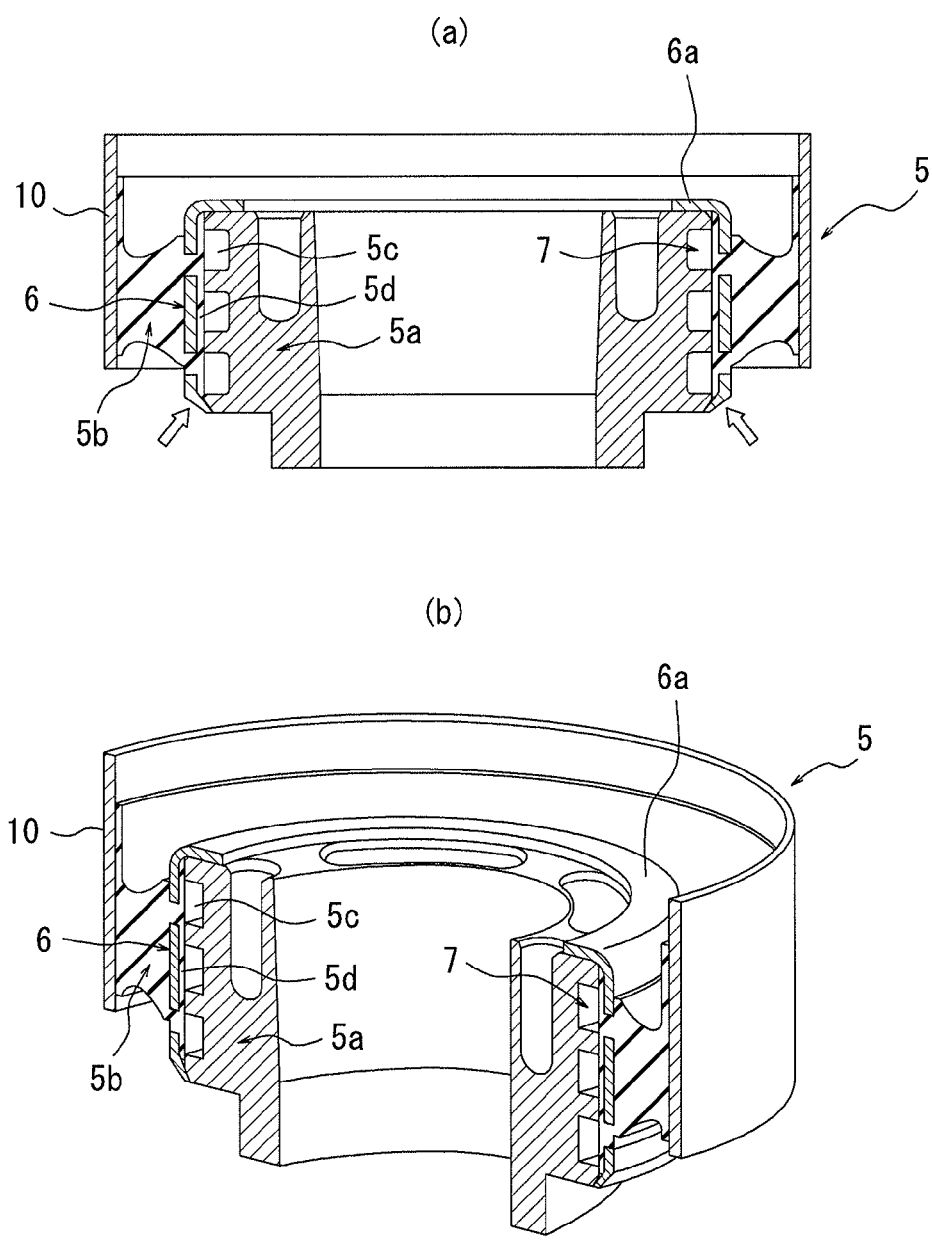
FIG. 3 is a sectional view and a sectional perspective view illustrating an assembled partition wall.

FIG. 3 is a sectional view of the partition wall 5 assembled as described above. The hollow arrow shown in FIG. 3(a) indicates the direction of the force input to the annular rigid member 5a when, for example, the lower-end section of the circumscribed rigid tube member 6 is subjected to plastic deformation so as to form the inward-flange inclined surface facing obliquely upward as described above. According to the obliquely upward input to the annular rigid member 5a as shown, the deformation of the wall section which contributes to forming the passage groove 5c may be effectively prevented. Therefore, the limiting passage 7 allows a required liquid flow therein in response to the increase and decrease of the inner pressure of the liquid chambers 8, 9 associated with the relative displacement of the inner and outer tubes 1, 2 in the axial direction, and thereby the anti-vibration device can always achieve a desired vibration-damping function.

Referring back to FIG. 1, the anti-vibration device is provided with a small-diameter end section 2a, which is disposed at an end portion of the outer tube 2 on the side of one of the rubber bodies, i.e. at an end portion of the outer tube 2 on the side of the lower-end rubber body 4 in the illustrated example, and which has an outer diameter that is smaller than the outer diameter of an end portion of the outer tube 2 on the side of the other rubber body 3 and the outer diameter of the outer tube 2 at a portion corresponding to the mounting position of the partition member 5. The small-diameter end section 2a is provided with a liquid injection inlet 12 which is sealed by a male member 11 formed of a rivet, a screw, a bolt or the like. When sealing the liquid injection inlet 12, a portion of the male member 11 may protrude from the outer surface of the small-diameter end section 2a. However, since the male member 11 is disposed at the small-diameter end section 2a of the outer tube 2, when the large-diameter portion of the outer tube 2 is, for example, inserted or press-fitted into a predetermined mounting member, the interference between the protruding section of the male member and the predetermined mounting member may be sufficiently prevented, as long as the protruding section of the male member 11 is positioned within the step between the large-diameter section and the small-diameter section of the outer tube 2.

Accordingly, the anti-vibration device allows the shear deformation of the rubber bodies 3, 4, the expansion and shrinkage deformation of the liquid chambers 8, 9, and hence the increase and decrease of the inner pressure of the liquid chambers as described above, in response to an input force, relative vibration or the like of the inner and outer tubes 1, 2 in the axial direction, and thereby may achieve an excellent anti-vibration and vibration-damping function.

In the anti-vibration device as shown, the upper-end rubber body 3 as shown is fixed to the inner tube 1 including the upper flange of the inner tube 1 by means of vulcanized adhesion or the like, and is also fixed to the inner circumferential surface of a rigid intermediate tube 13, which may be provided with a connection flange for connection with a vehicle or the like such that the connection flange is aligned with the upper flange of the outer tube 2. The intermediate tube 13 is integrally connected to the rubber body 3 also in such a way that that the inward flange 13a disposed at the lower end of the intermediate tube 13 is embedded into the rubber body 3.

As described above, the partition wall 5 has the annular rigid member 5a mounted around the inner tube 1 by means of press-fitting or the like and the elastic member 5b fixed to the circumscribed rigid tube member 6 and to the inner circumferential surface of the support tube 10 by means of vulcanized adhesion or the like. The circumscribed rigid tube member 6 is mounted on the outer circumferential surface of the annular rigid member 5a. The rigid member 5a as shown has the passage groove 5c which extends at least one time around the outer circumferential surface of the rigid member 5a and has a required sectional area and length.

The lower-end rubber body 4 as shown is fixed to the outer circumferential surface of an inner-tube sleeve 14 and to the inner circumferential surface of the outer tube 2 by means of vulcanized adhesion or the like. The inner-tube sleeve 14 is disposed below the partition wall 5 and is mounted around the inner tube 1 by means of press-fitting or the like. The outer tube 2 is mounted to the outer circumferential surface of the intermediate tube 13 and to the outer circumferential surface of the support tube 10 of the partition wall 5 via a rubber-lining layer disposed on the inner circumferential surface of the inner tube 2 in a liquid-tight manner by means of a diameter reduction process, while the upper-end flange 2b is aligned with the connection flange of the intermediate tube 13.

The small-diameter end section 2a of the outer tube 2 previously described extends along a region corresponding to the lower liquid chamber 9 as shown and along a region below the liquid chamber 9 where the rubber body 4 is fixed, and has an outer diameter that is smaller than the outer diameter of the end portion of the outer tube 2 on the side of the rubber body 3 and the outer diameter of the portion of the outer tube 2 corresponding to the mounting position of the partition wall 5. The outer tube 2 has the liquid injection inlet 12, which is formed on the small-diameter end section 2a at a position corresponding to the liquid chamber 9 and is sealed by the male member 11. The small-diameter end section 2a is preliminarily formed on the outer tube 2, thereby eliminating the need to perform a process, such as a diameter reduction process, for forming the small-diameter section after assembling the outer tube 2.

Therefore, according to the anti-vibration device, when the large-diameter portion of the outer tube 2 is inserted or press-fitted or the like into a predetermined mounting member so as to prepare the device for use for example, the small-diameter end section 2a serves as an insert guide or the like as the outer tube 2 is inserted into the mounting member. Accordingly, a required insertion, press-fitting or the like may be easily and quickly achieved without the need of the initial, precise positioning of the outer tube 2. Further in this case, the length of the portion of the outer tube 2 to be press-fitted or the like to the predetermined mounting member may be shortened by a length corresponding to the extending distance of the small-diameter end section 2a in the axial direction. Therefore the frictional force between the outer circumferential surface of the outer tube 2 and the inner circumferential surface of the mounting member may be effectively reduced, thereby effectively reducing the force required to press-in the outer tube 2.

In the anti-vibration device, the outer tube 2 is preferably provided with an inward flange 2c disposed at an end edge of the outer tube 2 on the side of the small-diameter end section 2a. The inward flange 2c is embedded into the rubber body 4. Similarly to the inward flange 13a disposed at the lower end of the intermediate tube 13, the inward flange 2c serves to reduce the amount of the shear deformation of the rubber body at the time of relative vibration of the inner and outer tubes 1, 2 in the axial direction for example, thereby increasing the amount of the increase and decrease of the inner pressure of the liquid chambers, and enhancing the vibration-damping function using the flow of the sealed liquid.

As shown in FIG. 1, the rubber body 3 is provided with an annular recess 3a which extends annularly around the inner tube 1 and opens to the liquid chamber 8. The rubber body 4 is provided with an annular recess 4a which extends annularly around the inner-tube sleeve 14 and opens to the atmosphere. According to the annular recesses 3a and 4a, it is possible to prevent the separation of the rubber bodies 3, 4 caused by the concentration of stress at the ends of the rubber bodies 3, 4 that are fixed to the inner tube 1 or to the inner-tube sleeve 14. Here, the concentration of stress is generated at the time of the shear deformation of the rubber bodies 3, 4 associated with the relative displacement of the inner and outer tubes 1, 2 in the axial direction.

As shown in FIG. 1, the inner tube 1 has a small-diameter section which is formed via a step section and has a uniform outer diameter at a portion where the partition wall 5 is mounted to. The inner circumferential surface of the annular rigid member 5a, which is, for example, press-fitted around the inner tube 1, has a tapered shape, such that the inner diameter of the annular rigid member 5a gradually decreases toward the lower side as shown, and that only the lower-half portion of the annular rigid member 5a frictionally engages with the small-diameter section of the inner tube 1. Accordingly, the force required to press-in the annular rigid member 5a against the inner tube 1 may be reduced. Moreover, the limit position, to which the annular rigid member 5a is press-fitted, may be identifiable by the step section of the inner tube 1.

According to the anti-vibration device, as previously discussed, in response to an input or relative vibration of the inner and outer tubes 1, 2 in the axial direction, the input and vibration can be isolated from a member on the transmitted side and be damped by the shear deformation of the rubber bodies. When the rubber bodies 3, 4 deform, the volume of the liquid chambers 8, 9 changes, and thereby the pressure of the liquid inside the liquid chambers 8, 9 changes, generating a flow of liquid between the liquid chambers 8, 9, which leads to a liquid column resonance inside the limiting passage 7. The input and vibration can be isolated and damped, also by the liquid column resonance and the flow resistance of the liquid flow through the limiting passage 7 or the like.

Further according to the anti-vibration device described above, after the divided air chambers are filled with required liquid via the liquid injection inlet 12, the injection inlet 12 is sealed by the male member 11. This allows the initial pressure of the liquid sealed inside the liquid chambers to be at atmospheric pressure. Therefore it is possible to sufficiently prevent the initial deformation of the rubber bodies 3, 4 and the initial stress exerted on the rubber bodies 3 and 4, thereby effectively eliminating the risk of degradation of the durability of the rubber bodies 3, 4. According to the device, one of the end portions of the outer tube is provided with the small-diameter end section, which may be preliminarily formed on the outer tube. Therefore, a diameter reduction process or the like does not need to be performed on the outer tube after the outer tube is formed, Additionally, according to the device, since the outer tube 2 has the small-diameter end section 2a at one end portion of the outer tube 2, the small-diameter end section 2a serves as a guide section as the outer tube is, for example, inserted or press-fitted into a predetermined mounting member. Therefore, a required insertion, press-fitting or the like can be performed easily, quickly and always appropriately, without the need to continue the precise positioning of the outer tube 2 with respect to the mounting member. Since only the large-diameter portion of the outer tube 2 other than the small-diameter end section 2a is, for example, pressed-in against the mounting member, the force required to press-in can be effectively reduced, compared to the case where the entire outer tube 2 is formed as a large-diameter portion.

Figure 4:
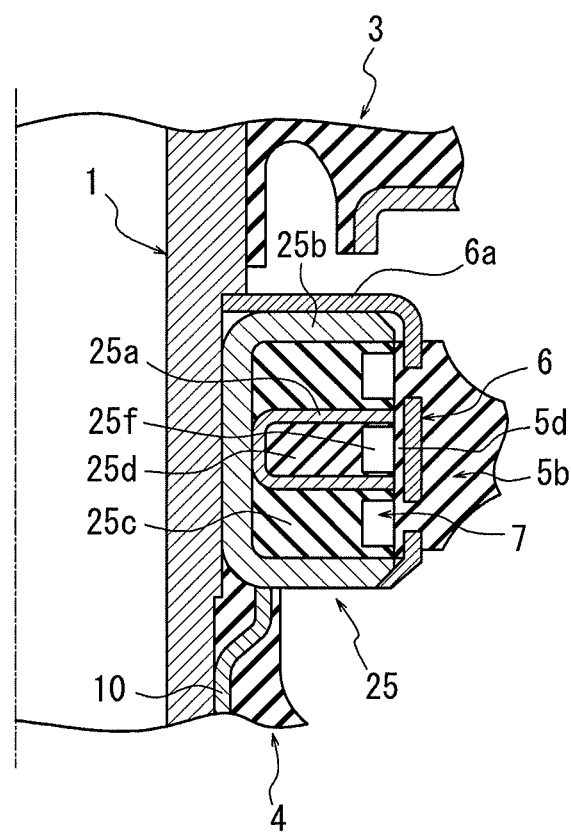
FIG. 4 is a sectional view showing another example of forming a passage groove.

FIG. 4 shows another example of forming a passage groove, in which the structure of an annular rigid member is modified. An annular rigid member 25 is configured in such a way that a pair of ring members 25a, 25b with a U-shaped section, which are formed by means of metal stamping and are of different sizes, are assembled such that their openings face circumferentially outwardly and that one is disposed in the other, a rubber material 25c is embedded between the ring members 25a and 25b, and a rubber material 25d is also embedded inside the inner ring member 25a. A required passage groove 25, which contributes to forming the limiting passage 7 on the outer circumferential surface of the annular rigid member 25, is formed on the outer circumferential surfaces of the rubber materials 25c, 25d.

Similarly to the aforementioned limiting passage 7, the limiting passage 7 formed by the passage groove 25*f* can achieve a desired damping function in response to the input to the inner tube 1 or the outer tube 2 and the relative displacement of the inner and outer tubes 1 and 2.

Alternatively, a partition wall may be configured in such a way that an annular rigid member is inscribed in the outer tube 2, and subsequently the inscribed annular rigid member is connected to the inner tube 1 via an elastic member.

In the illustrated example, a circular plate 16 is fixed onto the end section of the inner tube 1 on one end side of the inner tube 1 and is provided with a through hole being located at the center of the circular plate and having the size that substantially equals to the inner diameter of the inner tube 1. When using the device, a portion of either a member on the vibration-generating side or a member on the vibration-transmitted side (not shown) is inserted into the inside of the inner tube 1, and the inserted member is abutted on the circular plate 16. Accordingly, the circular plate 16 contributes to supporting the weight of the inserted member.

The rubber body 3, which is fixed to the outer circumferential surface of the inner tube 1 on one-end side of the inner tube 1, is also fixed to the inner circumferential surface of the intermediate tube 13 located inside the outer tube 2, such that the rubber body 3 connects the inner tube 1 and the intermediate tube 13 with each other. The intermediate tube 13 has a tubular section which engages with the inner circumferential surface of the outer tube 2 via a rubber lining, an inward flange 13*a* disposed at the end section of the tubular section on the side of the partition wall 5; and a flange disposed at the end section of the tubular section on the opposite side of the inward flange 13*a*. Either the member on the vibration-generating side or the member on the vibration-transmitted side is connected to the flange of the intermediate tube 13 via the mounting hole.

In the illustrated example, the portion of the rubber body 3 sandwiched between the inner tube 1 and the inward flange 13*a* is provided with a recess 3*a*, which surrounds the inner tube 1 and contributes to forming the liquid chamber 8. According to the recess 3*a*, it is possible to reduce the concentration of stress at the elastic portion between the inner tube 1 and the inward flange 13*a* caused when the rubber body 3 undergoes shear deformation in response to the input in the central axis direction to the inner tube 1.

As shown in FIG. 1, one rubber body 3 is fixed to the outer circumferential surface of the inner tube 1, formed of a rigid material, on one-end side of the inner tube 1 (on the upper-end side as shown). The inner-tube sleeve 14 formed of a rigid material is fitted to the outer circumferential surface of the inner tube 1 on the other-end side of the inner tube 1 (on the lower-end side as shown). The other rubber body 4 is connected to the inner tube 1 via the inner-tube sleeve 14. The annular rigid member 5*a*, protruding from the inner tube 1 toward the outer tube, is fitted to the outer circumferential surface of the inner tube 1. In this case, the outer diameter of the inner tube 1 is made smaller via a step 1*m* at a portion 1*b* where the partition wall 5 is fitted to, compared to a large-diameter portion 1*a* where the rubber body 3 is fixed to. The outer diameter of the inner tube 1 is made further smaller via a step 1*n* at a portion 1*c* where the inner-tube sleeve 14 is fitted to.

Figure 5:
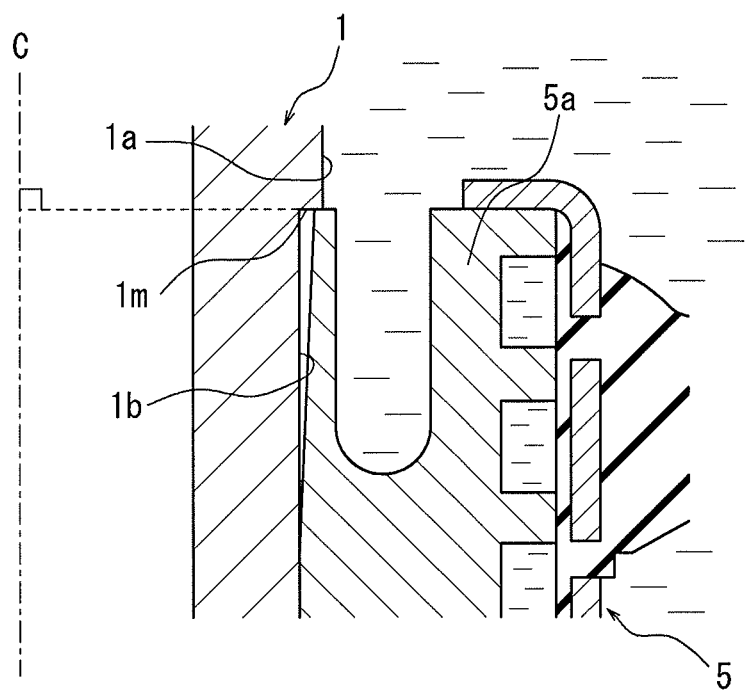
FIG. 5 is an enlarged sectional view of a primal portion of the device shown in FIG. 1.
Figure 6:
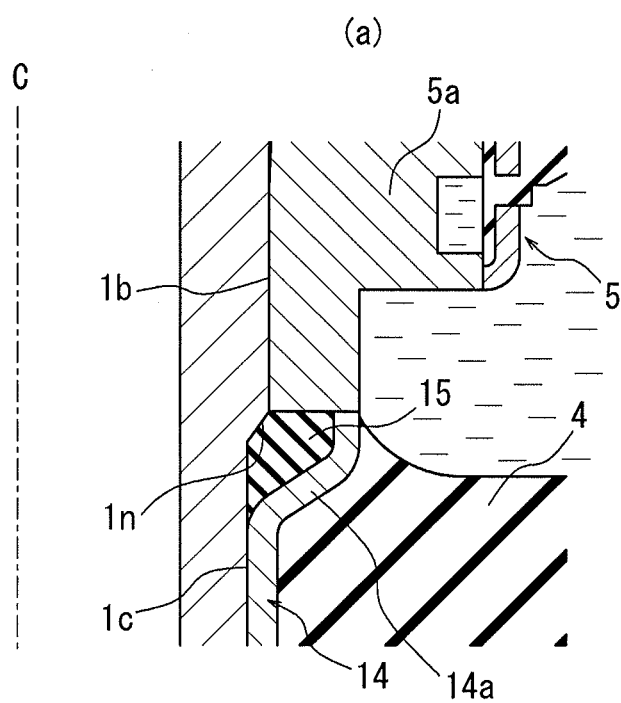
FIG. 6 is an enlarged sectional view showing another primal portion of the device shown in FIG. 1 and showing a variation of the same.
Figure 6:
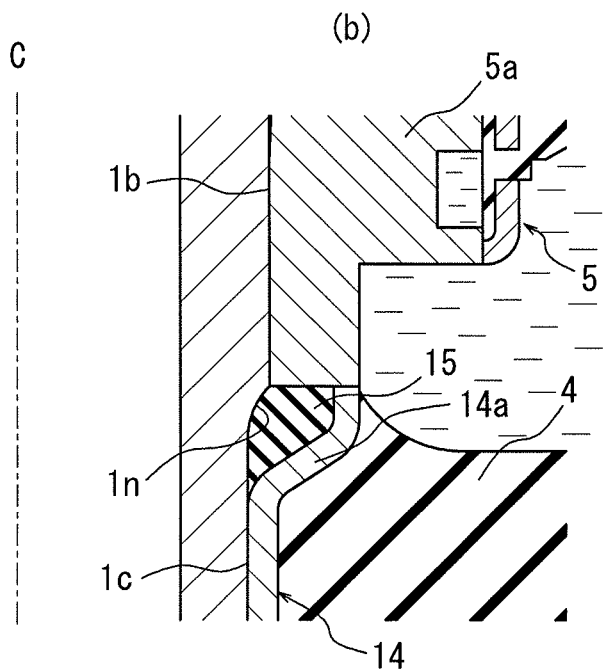

As shown in the enlarged sectional view of FIG. 5, the step 1*m* has a flat surface and extends perpendicularly to the central axis C of the inner tube 1. On the other hand, the step 1*n* serves to continuously form the portion 1*b*, where the partition wall 5 is fitted to, and the portion 1*c*, where the inner-tube sleeve 14 is fitted to. For this reason, the step 1*n* is not limited to having a flat surface as the step 1*m*, and may also have, for example, a tapered surface as shown in FIG. 6(*a*) or a curved-and-tapered surface as shown in FIG. 6(*b*).

The end portion of the inner-tube sleeve 14 on the side of the partition wall 5 is provided with a large-diameter portion 14*a* having a diameter larger than the other portion of the inner-tube sleeve 14. A ring-shaped annular elastic member 15, formed of an elastic material, is disposed between the large-diameter portion 14*a* and the inner tube 1, and is preferably subjected to elastic deformation. The annular elastic member 15 serves to prevent the leakage of the liquid from the liquid chamber 9 at the fitting portion of the inner tube 1 and the inner-tube sleeve 14, both of which are formed of a rigid material, and also serves to prevent the leakage of the liquid passing through the fitting portion of the inner tube 1 and the partition wall 5, both of which are also formed of a rigid material.

The end portion of the outer tube 2 on the side of the inner-tube sleeve 14 is provided with an inward flange section 2*c*. Similarly to the aforementioned recess 3*a*, in order to reduce the concentration of stress at a portion of the rubber body 4 that is sandwiched between the inward flange section 2*c* and the inner-tube sleeve 14, a recess 4*a* is formed in this elastic portion so as to surround the inner-tube sleeve 14.

In the illustrated example, the partition wall 5 has the annular rigid member 5*a*, the circumscribed rigid tube member 6 shaped like tubular surrounding the outer circumferential surface of the annular rigid member 5*a*, the support tube 10 disposed circumferentially outward of the circumscribed rigid tube member 6 and engaging with the inner circumferential surface of the outer tube 2 via a rubber lining, and the elastic member 5*b* connecting the circumscribed rigid tube member 6 and the support tube 10 with each other and contributing to forming the liquid chambers 8, 9. The annular rigid member 5*a* has the passage groove 5*c*, which is dented inwardly from the outer circumferential surface, has a rectangular sectional shape and extends helically for example. The passage groove 5*c* contributes to forming the limiting passage 7.

As shown in FIGS. 1 and 5, the inner circumferential surface of the annular rigid member 5*a*, which frictionally engages directly with the outer circumferential surface of the inner tube 1, may have a tapered section, which is gradually spaced farther from the outer circumferential surface of the inner tube 1 and the diameter of which gradually increases toward one end of the inner tube 1, at least along the end portion of the annular rigid member 5*a* on the side of the one end of the inner tube 1.

In order to further reduce the press-in force required to fit the partition wall 5 to the outer circumferential surface of the inner tube 1 when manufacturing the device, it is preferable that a thin-walled section 5*j*, having an outer diameter that is smaller than the outer diameter of the other portion of the annular rigid member 5*a*, is formed at an end portion of the annular rigid member 5*a* on the side of the inner-tube sleeve 14 as shown in FIG. 1, and a portion of the annular rigid member 5*a* other than the thin-walled portion 5*j* is provided with the limiting passage 7. The thin-walled section 5*j* as shown has a cylindrical shape, such that the outer diameter of the thin-walled section 5*j* is made smaller via a step below the limiting passage 7. Alternatively, the thin-walled section 5*j* may have, although not shown, a tapered shape or a curved-and-tapered shape for example, such that the outer diameter of the thin-walled section 5*j* gradually decreases toward the inner-tube sleeve 14, regardless of the presence of such a step.

As shown in FIG. 1, the annular rigid member 5*a* of the partition wall 5 may be provided with an annular recess, which is disposed circumferentially inward of the limiting passage 7, is dented from the end surface of the annular rigid member 5a on the side of the rubber body 3 toward the rubber body 4, and extends along an entire circumference. According to this configuration, the device may be lighter in weight, and it is possible to reduce the damaging of the limiting passage 7 caused by mounting the annular rigid member 5a to the outer circumferential surface of the inner tube 1 by means of frictional engagement.

When manufacturing the anti-vibration device, the members are assembled into the anti-vibration device as follows: first of all, as shown in the exploded sectional view of FIG. 7(a), the inner tube 1 and the intermediate tube 13 surrounding one end of the inner tube 1 are connected with each other by the rubber body 3; the annular rigid member 5a making up an inner-circumferential portion of the partition wall 5 is fitted onto an inner-tube-side member 80 from the other end of the inner tube 1, the inner-tube-side member 80 being configured by integrally connecting a circular plate to an end section of the inner tube 1 on the one end of the inner tube 1, the annular rigid member 5a making up an inner-circumferential portion of the partition wall 5; and subsequently the annular rigid member 5a is frictionally engaged around the inner tube 1.

As discussed above, the diameter of the portion 1c of the inner tube 1, where the inner-tube sleeve 14 is fitted to, is made smaller than the diameter of the portion 1b of the inner tube 1, where the partition wall 5 is fitted to. Therefore the partition wall 5 may be fitted under the exertion of a small frictional force or in a non-contact state. As a result, the partition wall 5 may be mounted to the inner tube 1 easily and precisely in a short period of time without causing burrs or the like on the fitting surfaces of these members.

The outer diameter of the inner tube 1 is made smaller via the flat-surfaced step 1m extending perpendicularly to the central axis of the inner tube 1, at the portion 1b where the partition wall 5 is fitted to, than at the large-diameter portion 1a where the rubber body 3 is fixed to. Accordingly, the positioning of the partition wall 5 is possible, and an appropriate locating of the partition wall 5 on the inner tube is made easier, thereby effectively reducing the time required for mounting the partition wall 5.

As illustrated, the inner circumferential surface of the annular rigid member 5a has a tapered shape at least along an end portion of the annular rigid member 5a on one end side of the inner tube 1 when the annular rigid member 5a is in a position to be fitted to the inner tube 1, such that the diameter of the inner circumferential surface of the annular rigid member 5a gradually increases toward the one end of the inner tube 1. According to the tapered, diameter-enlarging portion of the inner circumferential surface of the annular rigid member 5a, the partition wall 5 may be fitted to the outer circumferential surface of the inner tube 1 in an induced manner, and the area between the inner tube 1 and the annular rigid member 5a on which a large frictional force is exerted may be further reduced. Therefore the partition wall 5 may be fitted to the inner tube 1 more easily.

Figure 7:
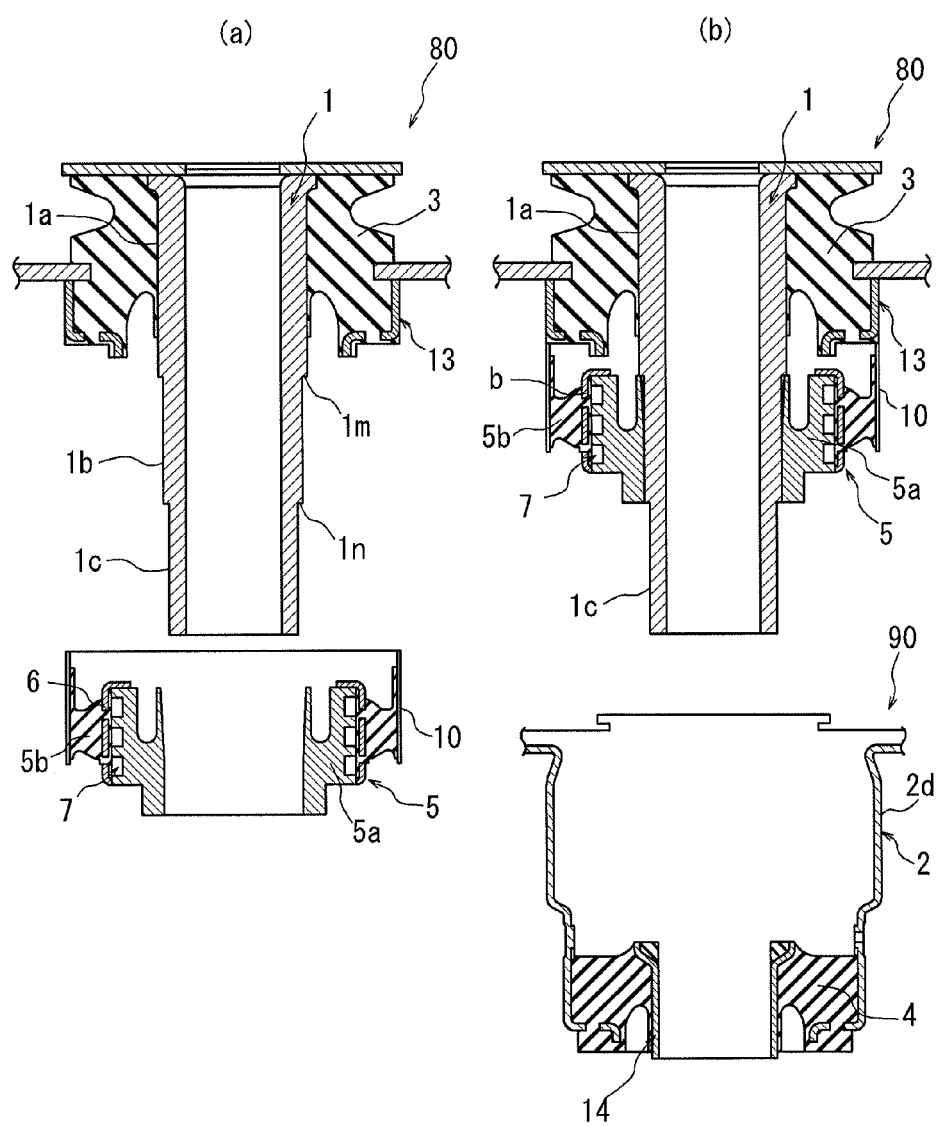
FIG. 7 is an exploded perspective view showing the steps of assembling the members.

Subsequently, as shown in FIG. 7(b), an outer-tube-side member 90 is fitted to the outer circumferential surface of the inner tube 1 via the inner-tube sleeve 14 of the outer-tube-side member 90, such that the outer-tube-side member 90 is frictionally engaged with the inner tube 1, wherein the outer-tube member 90 is configured by connecting the outer circumferential surface of the inner-tube sleeve 14 and the inner circumferential surface of the outer tube 2 with each other via the rubber body 4. The inner diameter of the inner-tube sleeve 14 is sized so as to enable the inner-tube sleeve 14 to frictionally engage with the portion 1c of the inner tube 1 where the inner-tube sleeve 14 is fitted to. In other words, the inner diameter of the inner-tube sleeve 14 substantially equals to the outer diameter of the portion 1c of the inner tube 1 where the inner-tube sleeve 14 is fitted to.

Lastly, the enlarged-diameter tube section 2d of the outer tube 2 is subjected to drawing, causing plastic deformation of the enlarged-diameter tube section 2d, and thereby tightly securing the intermediate tube 13 and the support tube 10 disposed circumferentially inward of the enlarged-diameter tube section 2d. According to the anti-vibration device manufactured as explained above, it is possible to reduce the occurrence of burrs or the like on the outer circumferential surface of the inner tube 1 or on the inner circumferential surface of the annular rigid member 5a, and to reduce the concentration of stress at the annular rigid member 5a provided with the limiting passage 7 caused by the fitting under the exertion of a large frictional force. Therefore, it is possible to prevent a lower performance of the anti-vibration device due to lower precision of the assembling.

Figure 8:
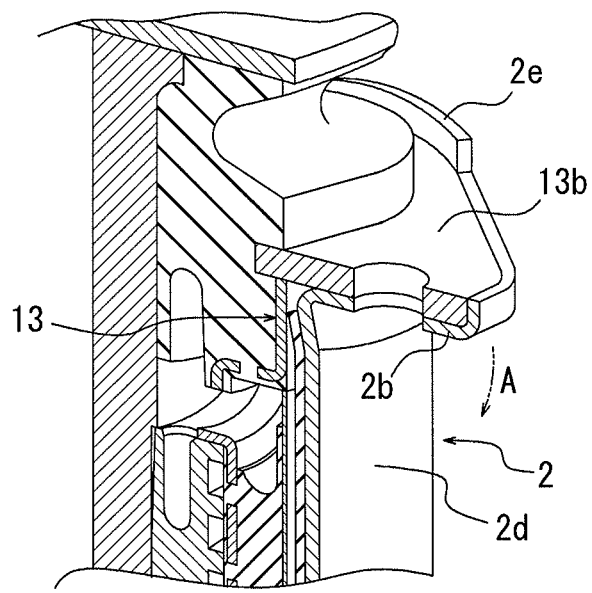
FIG. 8 is an enlarged sectional perspective view showing a portion of the device shown in FIG. 1.
Figure 8:
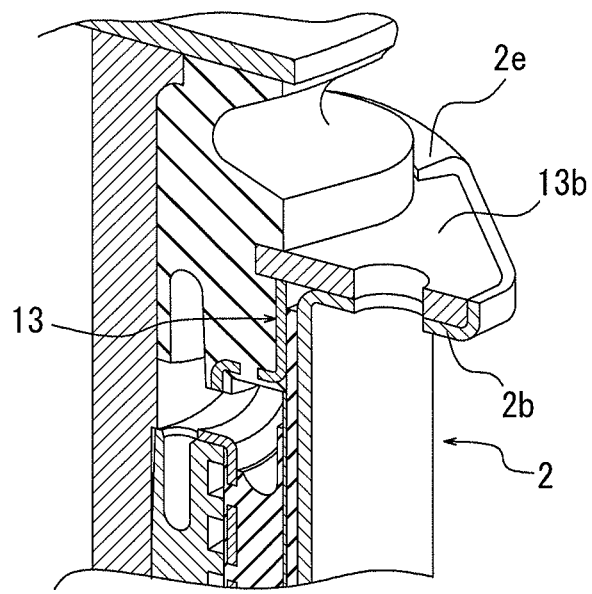

When subjecting the enlarged-diameter tube section 2d of the outer tube 2 as described above, the following is preferable: as shown in FIGS. 1 and 8, an end section of the outer tube 2 on the side of a flange 13b (on the upper side as shown) is preliminarily formed with an upper flange 2b which covers the lower and side surfaces of the flange 13b; and prior to the drawing of the enlarged-diameter tube section 2b, as shown in the sectional perspective views of FIGS. 8(a) and 8(b), an upward sticking-out section 2e is bent inwardly toward the flange 13b by means of plastic deformation, the sticking-out section 2e being provided on at least a portion of the side wall of the upper-end flange 2b, such that the flange 13b is fixedly sandwiched between the upper-end flange 2b and the sticking-out section 2e of the outer tube 2.

Accordingly, it is possible to suppress the downward bending of the upper-end flange 2b as shown (indicated by a virtual arrow A in FIG. 8(a)) due to the drawing of the enlarged-diameter tube section 2d. Therefore, the outer tube 2 may be accurately mounted at a desired position on the intermediate tube 13. As a result, the quality of the anti-vibration device may be enhanced.

Figure 9:
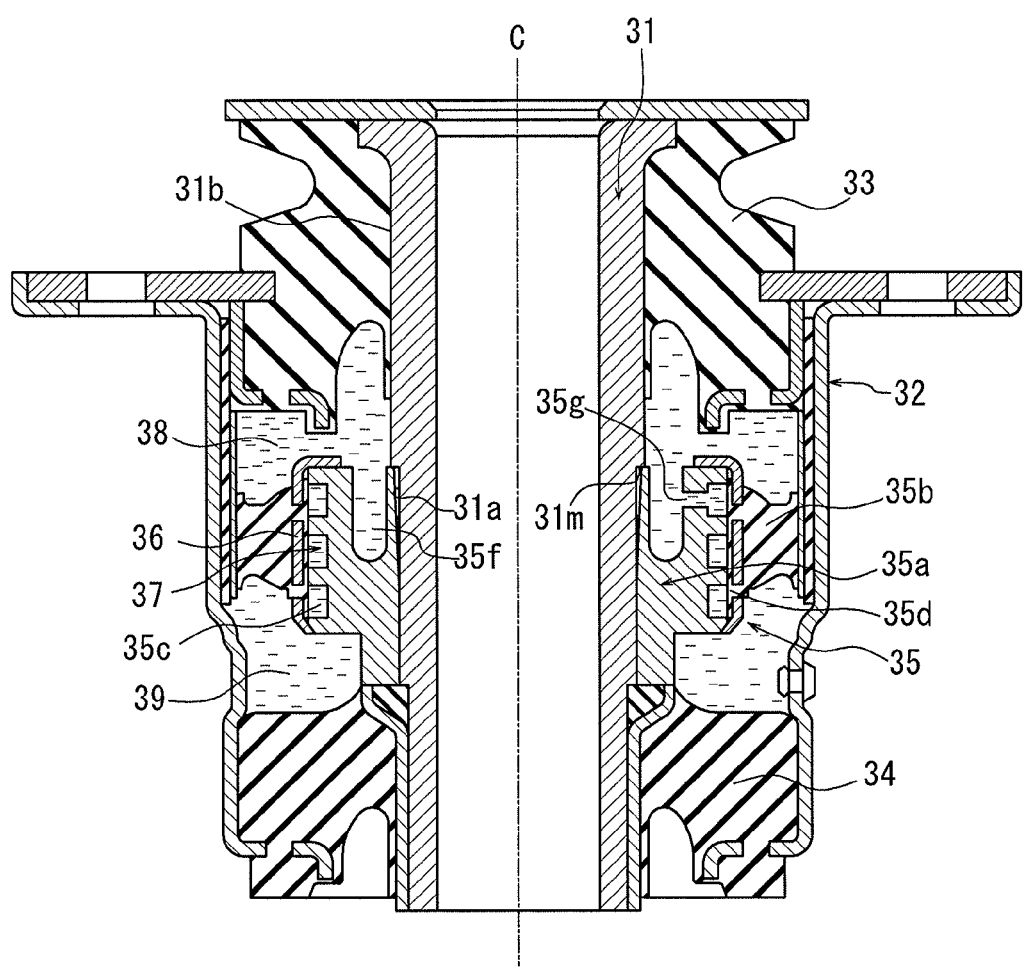
FIG. 9 is a view similar to FIG. 1, showing another embodiment of the present invention.

Another embodiment of the present invention is shown in FIG. 9 which is similar to FIG. 1. The anti-vibration device illustrated in the longitudinal sectional view of FIG. 9 comprises: an inner tube 31 formed of a rigid material; an outer tube 32 disposed circumferentially outward of the inner tube 31 and also formed of an a rigid material; annular rubber bodies 33, 34 interconnecting the inner tube 31 and the outer tube 32 in a liquid-tight manner at two positions spaced in a C-axis direction, a partition wall 35 disposed between the rubber bodies 33, 34 and dividing the space between the inner tube 31 and the outer tube 32 into two parts in the C-axis direction; liquid chambers 38, 39 configured in such a way that the spaces divided by the partition wall 35 are filled with non-compressible liquid; and a limiting passage 37 provided on the partition wall 35 so as to connect the liquid chambers with each other.

Figure 10:
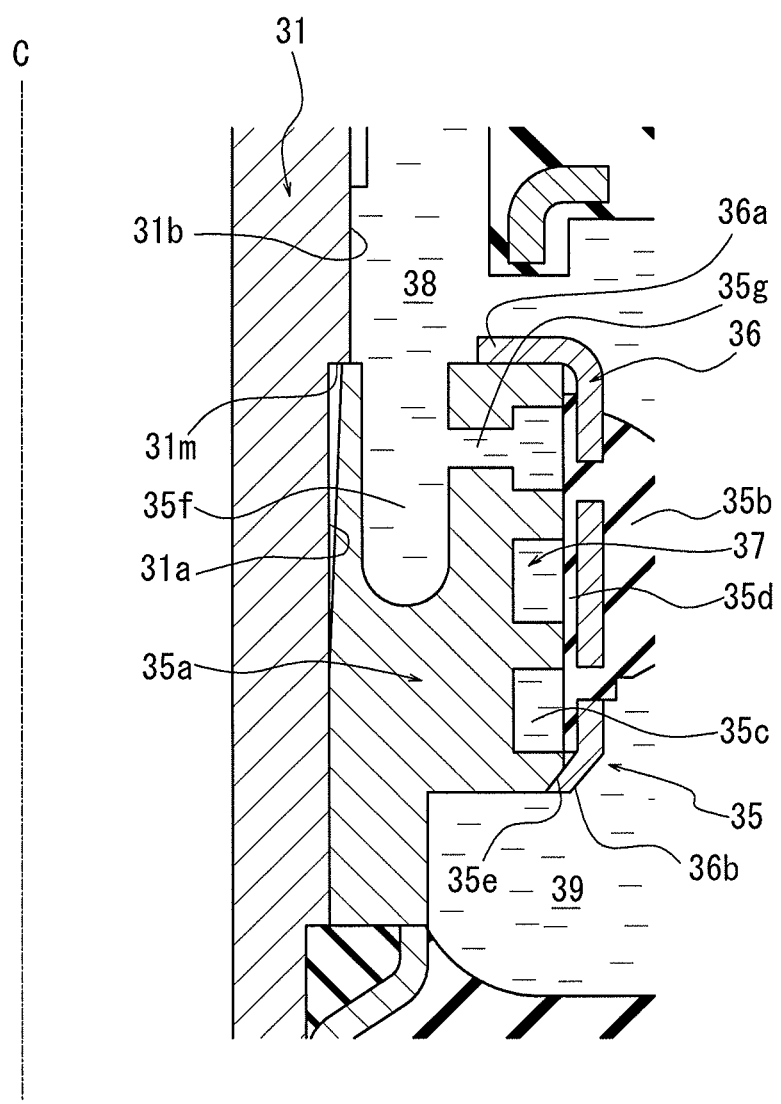
FIG. 10 is a partial enlarged longitudinal-sectional view of the anti-vibration device shown in FIG. 9.

As shown in the partial enlarged sectional view of FIG. 10, the partition wall 35 has: an annular rigid member 35a projecting from the inner tube 31 toward the outer tube 32 and being formed as a separate member from the inner tube 31; a circumscribed rigid tube member 36 circumscribing around the annular rigid member 35a; and an elastic member 35b connecting the circumscribed rigid tube member 36 to an outer-tube-side member. The annular rigid member 35a has a passage groove 35c, which is dented inward from the outer circumferential surface of the annular rigid member 35a, has a rectangular section, and extends helically for example. The limiting passage 37 is formed in such a way that the passage groove 35c is capped by the circumscribed rigid tube member 36 in a liquid-tight manner via a cylindrical seal member 35d, which is integrally formed with the elastic member 35b in the illustrated example.

In order for the limiting passage 37 to open to one liquid chamber 38 located on the upper side as shown, an end surface of the annular rigid member 35a on the side of the liquid chamber 38 may be formed with a recess 35f, which is disposed radially inward of the passage groove 35c, extends toward the other liquid chamber 39 in the axial direction and extends along an entire circumference, and a radial hole 35g may be formed, wherein the radial hole 35g extends from the recess 35f and has a circular longitudinal section for example. According to this configuration, the limiting passage 37 may be opened to the liquid chamber 38 without reducing the rigidity anywhere in the annular rigid member 35a. Therefore, upon input of a torsion force in a direction intersecting with the axial direction of the anti-vibration device, the deforming, damaging, or the like of the limiting passage 37 may be sufficiently prevented, and a desired vibration-damping function may be achieved.

The configuration of the recess 35f is not limited to the configuration in the illustrated embodiment, where the recess 35f extends along an entire circumference. Alternatively, the recess 35f may be arc-shaped. Alternatively, a recess having a circular section, for example, may be provided on an end surface of the annular rigid member. Alternatively, a plurality of recesses having a circular section, for example, may be provided on an end surface of the annular rigid member, wherein the recesses are spaced from each other in the circumferential direction.

In the illustrated example, the recess 35f and the radial hole 35g are provided only in the end section of the annular rigid member 35a on the side of one liquid chamber 38, while cutout portions (not shown) are formed in the end section of the annular rigid member 35a on the side of the other liquid chamber 39. Alternatively, such a recess and a radial hole may be formed in both end sections of the annular rigid member 35a. In a case where a recess and a radial hole are formed in each end section of the annular rigid member, the limiting passage may be opened to a liquid chamber without requiring the cutout portions to be formed on either end of the annular rigid member. Therefore, it is possible to sufficiently prevent the deforming or damaging etc. of the limiting passage due to lower rigidity sections created by the cutout portions.

Figure 11:
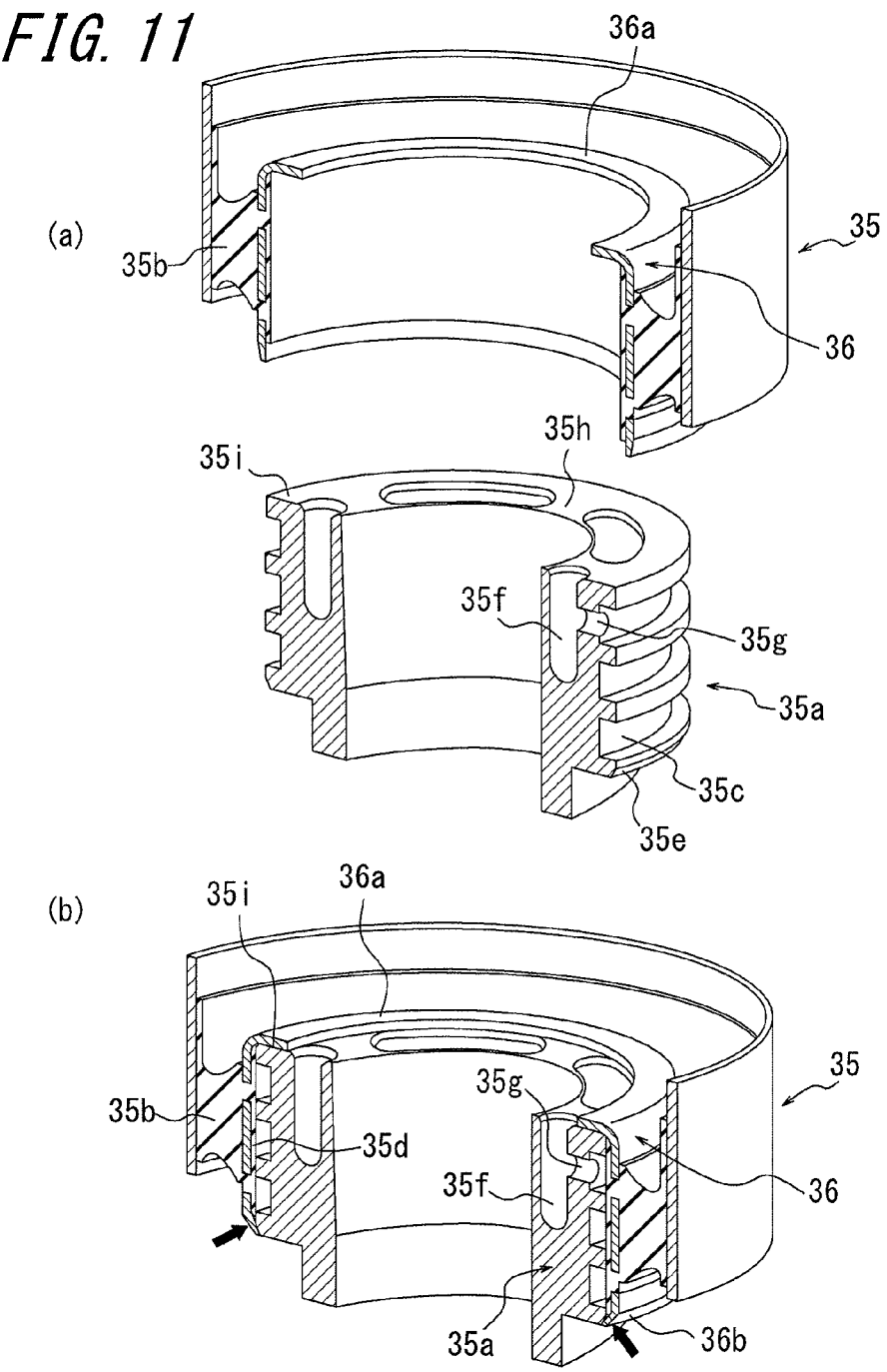
FIG. 11 is a sectional perspective view illustrating the steps of assembling the partition wall of the anti-vibration device shown in FIG. 9.

When configuring the partition wall 35 of the anti-vibration device, as shown in the sectional perspective view of FIG. 11(a), in which the partition wall 35 is in an exploded state, the upper-end surface of the annular rigid member 35a as shown is preliminarily formed with a recess 35f and a radial hole 35g, with the passage groove 35c being formed on the outer circumferential surface of the annular rigid member 35a, before the annular rigid member 35a is fitted to the inside of the circumscribed rigid tube member 36, wherein the recess 35f extends in the axial direction and extends along an entire circumference in the illustrated example, and the radial hole 35g extends circumferentially outwardly from the entire-circumferential recess 35f. As illustrated, a reinforcement portion 35h, which makes up a part of the annular rigid member 35a, may be provided at a plurality of positions in the circumferential direction at the opening section of the entire-circumferential recess 35f.

Subsequently, as shown in FIG. 11(b), the annular rigid member 35a is press-fitted to the inside of the circumscribed rigid tube member 36 for frictional engagement therewith via the seal member 35d, and a region 35i of the annular rigid member 35a, located radially outward of the recess 35f formed on the annular rigid member 35a, is abutted on an inward flange 36a provided at the upper-end portion of the circumscribed rigid tube member 36 as shown, so as to position the annular rigid member 35a. Then, the lower-end portion of the circumscribed rigid tube member 36 as shown is bent over by means of plastic deformation so as to form an inward flange 36b as shown by the arrows, such that the annular rigid member 35a is fixedly sandwiched between the inward flanges 36a, 36b.

According to the partition wall 35 configured as described above, the annular rigid member 35a is tightly sandwiched between the inward flanges 36a, 36b disposed at the end portions of the circumscribed rigid tube member 36. Therefore the circumscribed rigid tube member 36 may be tightly mounted to the annular rigid member 35a.

In this case, as the annular rigid member 35a is sandwiched between the inward flanges 36a, 36b of the circumscribed rigid tube member 36, and the end sections of the annular rigid member 35a are subjected to the forces exerted by the inward flanges 36a, 36b. However, as discussed above, since a lower rigidity section exists nowhere in the end section of the annular rigid member 35a (in the upper-end section as shown) where the limiting passage 37 shown in FIG. 9 is opened to the liquid chamber 38 via the recess 35f and the radial hole 35g, it is possible to prevent the deforming or the like due to the forces in the axial direction exerted by the inward flange 36a.

In order to prevent the deforming, damaging or the like due to the force exerted by the inward flange 36b at the time of sandwiching the annular rigid member 35a, the outer circumferential surface of the annular rigid member 35a at the end section on the side of the liquid chamber 39 (on the lower side as shown), provided with cutout portions (not shown) instead of the recess and the radial hole, may be preliminarily formed with a tapered surface 35e, such that the diameter of the outer circumferential surface of the annular rigid member 35a gradually decreases toward the lower side, and the end portion of the circumscribed rigid tube member 36 on the side of the liquid chamber 39 (on the lower side as shown) may be bent over so as to be aligned with the tapered surface 35e, forming the obliquely inward flange 36b.

Since the flange 36b, formed by bending over the end portion of the circumscribed rigid tube member 36, extends obliquely inward as shown, the force exerted by the obliquely inward flange 36b is applied in the direction perpendicular to the tapered surface 35e, thereby sufficiently reducing the input in the compression direction to the portion of the annular rigid member 35a on the side of the liquid chamber 39, where the passage groove is formed. Accordingly, it is possible to prevent the damaging or the like of the end section of the annular rigid member 35a on the side of the liquid chamber 39 where the recess 35f and the radial hole 35g are not provided. When a torsion force is input to the anti-vibration device as the device is in use, the force exerted by the obliquely inward flange 36b is applied in the direction perpendicular to the tapered surface 35e of the annular rigid member 35a in a similar manner. Therefore it is possible to prevent the deforming, damaging or the like of the limiting passage 37 due to the torsion force as well.

As shown in FIGS. 9 and 10, the following configuration is preferable: the annular rigid member 35a of the partition wall 35 is fitted to the outer circumferential surface of the inner tube 31 for frictional engagement therewith; the outer diameter of the inner tube 31 is made smaller via a flat-surfaced step 31m at the fitting portion 31a compared to a portion 31b where the upper rubber body 33 as shown is fixed to, wherein the step 31m extends in the direction perpendicular to the central axis C of the inner tube 31; and a section of the annular rigid member 35a is abutted on the flat-surfaced step 31m, wherein the section is located radially inward of the recess 35f provided on the annular rigid member 35a. It is preferable that, as shown in FIG. 10, the inner circumferential surface of the annular rigid member 35a has a tapered shape, such that the diameter of the inner circumferential surface of the annular rigid member 35a gradually increases from its mid-length toward the liquid chamber 38.

Figure 12:
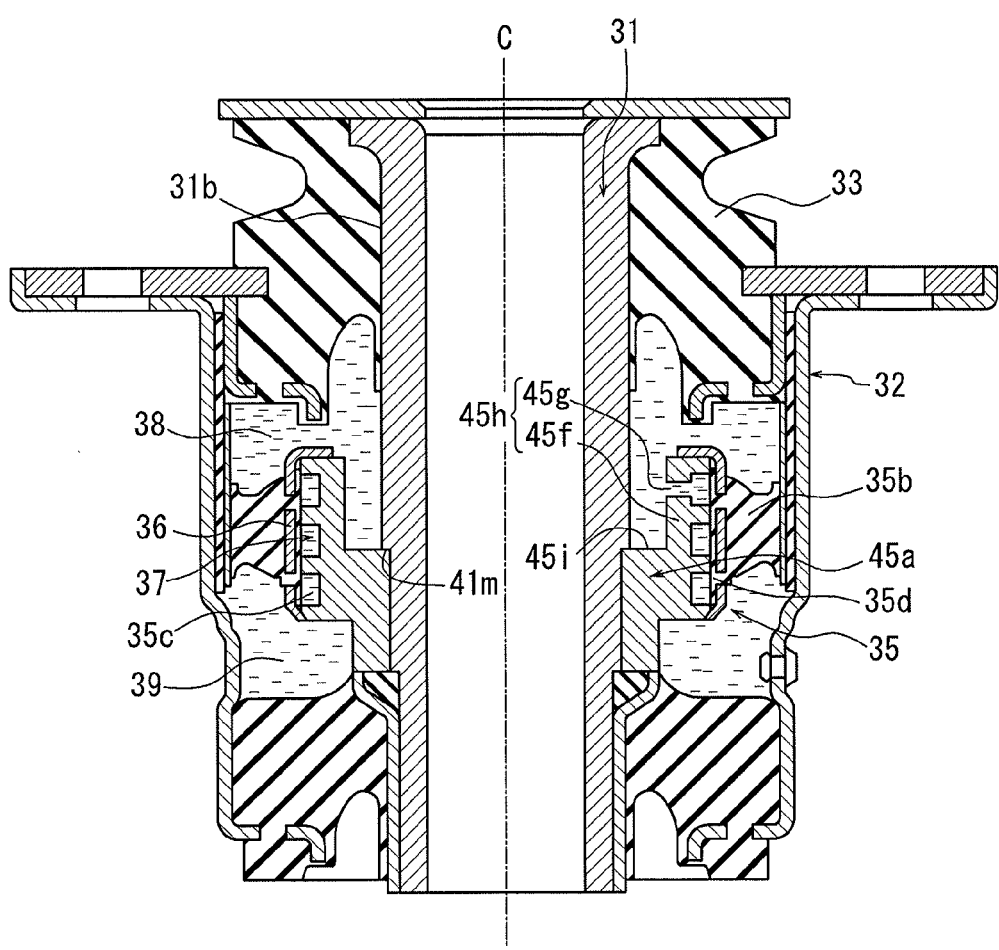
FIG. 12 is a longitudinal-sectional view similar to FIG. 9, showing a variation of the annular rigid member of the anti-vibration device shown in FIG. 9.

FIG. 12 shows a variation of the aforementioned annular rigid member. In the configuration shown in FIG. 12, alternatively to the recess 35f provided on the annular rigid member 35a shown in FIG. 9, the end portion of an annular rigid member 45a on the side of the liquid chamber 38 (on the upper side as shown) is formed with an enlarged-diameter section 45f, the inner diameter of which is being enlarged, and the inner circumferential surface of the enlarged-diameter section 45f is formed with a radial hole 45g extending circumferentially outwardly, thereby forming a through hole 45h, extending in the axial direction and extending circumferentially outwardly. The limiting passage 37 is opened to the liquid chamber 38 via the through hole 45h. In this variation, since the aforementioned lower rigidity section is formed nowhere in the annular rigid member 45a, it is possible to effectively prevent the deforming, damaging or the like of the limiting passage 37.

In the embodiment shown in FIG. 12, the step 41m formed on the outer circumferential surface of the inner tube 31 is located further downward as shown, compared to the step shown in FIG. 9. Accordingly, when manufacturing the device, the annular rigid member 45a is frictionally engaged with the outer circumferential surface of the inner tube 31, such that the bottom surface 45i of the enlarged-diameter section 45f of the annular rigid member 45a is abutted on the step 41m, and thereby easier positioning of the annular rigid member 45a may be achieved. In this case, in order to achieve easier mounting of the annular rigid member to the outer circumferential surface of the inner tube, the device shown in FIG. 9 is more preferable than the device shown in FIG. 12 in that it enables visual verification of the section where the annular rigid member and the step of the inner tube are in abutment with each other.

Figure 13:
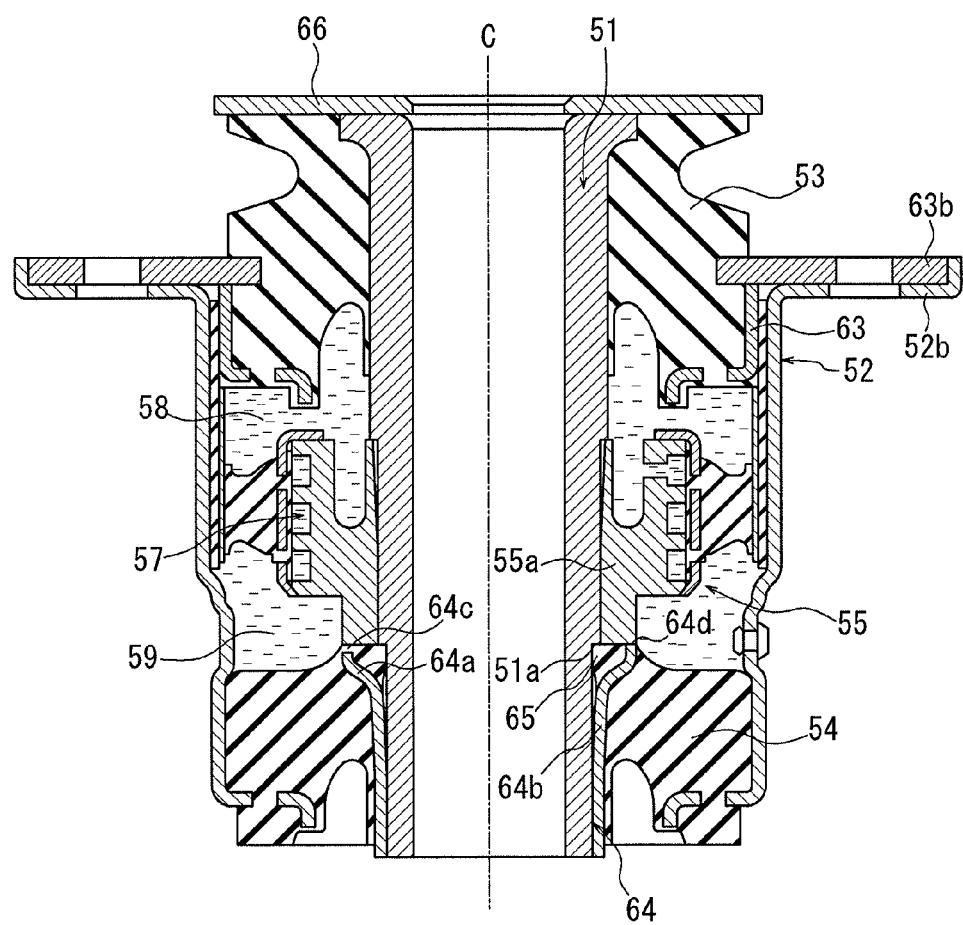
FIG. 13 is a view similar to FIG. 1, showing a further embodiment of the present invention.

FIG. 13 shows a further embodiment of the present invention. The anti-vibration device shown in the longitudinal sectional view of FIG. 13 comprises: an inner tube 51; an outer tube 52 located circumferentially outward of the inner tube 51; a pair of rubber bodies 53, 54 interconnecting the inner tube 51 and the outer tube 52 in a liquid-tight manner at two positions spaced in the C-axis direction; a partition wall 55 being disposed between the rubber bodies 53, 54 and dividing the space between the inner tube 51 and the outer tube 52 into two parts in the C-axis direction; liquid chambers 58, 59 configured in such a way that the spaces divided by the partition wall 55 are filled with non-compressible liquid; and a limiting passage 57 provided in the partition wall so as to connect the liquid chambers with each other.

The lower rubber body 54 is disposed between the outer tube 52 and an inner-tube sleeve 64, located circumferentially inward of the outer tube 52, and is fixed to the outer tube 52 and the inner-tube sleeve 64 by means of vulcanized adhesion or the like, and the inner-tube sleeve 64 is frictionally engaged with the outer circumferential surface of the inner tube 51, whereby the rubber body 54 is connected to the inner tube 51 via the inner-tube sleeve 64.

Figure 14:
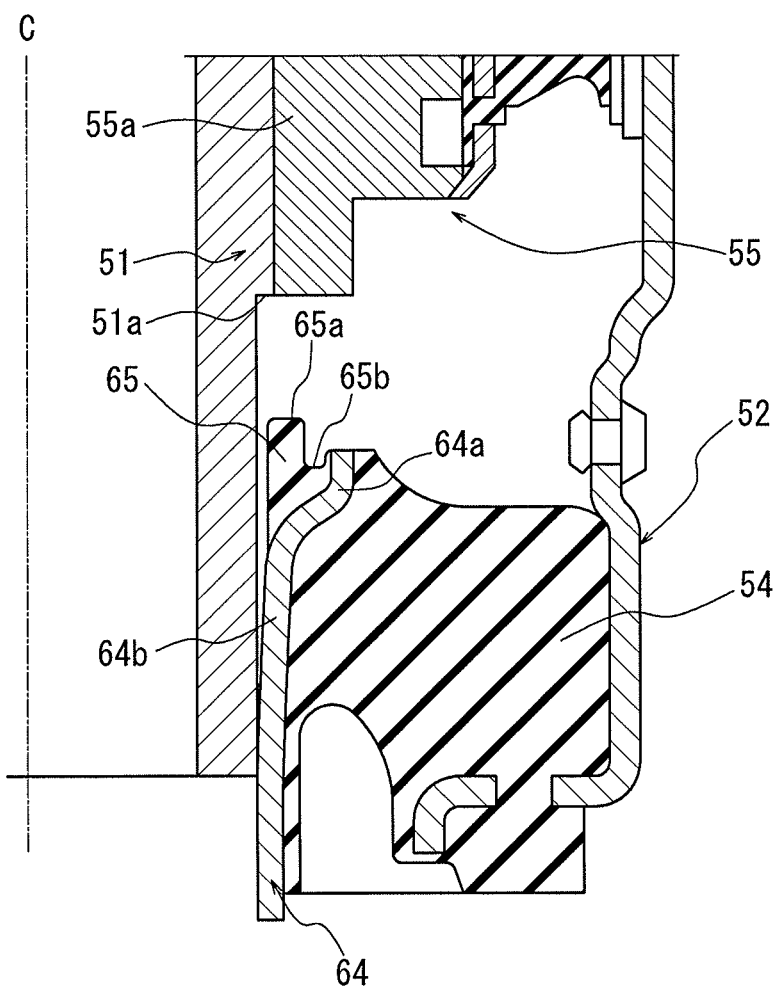
FIG. 14 is a partial enlarged sectional view of the device shown in FIG. 13 in a state before an inner-tube sleeve frictionally engages with an inner tube completely.

The end portion of the inner-tube sleeve 64 on the side of the liquid chamber 59 (on the upper portion as shown) is formed with an enlarged diameter portion 64a, having its diameter enlarged compared the other portion of the inner-tube sleeve 64, and has a shape of the trumpet in the illustrated example. An annular elastic member 65, integrally formed with the rubber body 54, may be provided between the enlarged-diameter portion 64a and the outer circumferential surface of the inner tube 51. FIG. 14 is an enlarged sectional view illustrating the inner-tube sleeve 64 in a state before frictionally engaging with the outer circumferential surface of the inner tube 51 completely. As illustrated, the upper surface of the annular elastic member 65 as shown is provided with an annular protruding section 65a, sticking out in the C-axis direction, and is formed with a recess 65b, being disposed circumferentially outward of the protruding section 65 and extending along an entire circumference.

When the inner-tube sleeve 64 and the annular elastic member 65 are frictionally engaged with the inner tube 51 completely, as shown in FIG. 13, the protruding section 65a of the annular elastic member 65 is compressed by the step 51a, provided on the outer circumferential surface of the inner tube 51, and by the substantially-cylindrical rigid member 55a, making up the inner circumferential portion of the partition wall 55, and deforms toward the recess 65b so as to be crimped onto the outer circumferential surface of the inner tube 51. Accordingly, the filling ratio of the annular elastic member within the enlarged-diameter portion 64a may be increased, and the leakage of the sealed liquid through the gap between the inner-tube sleeve 64 and the inner tube 51 may be positively prevented. Since the rigid portion 64b of the inner-tube sleeve 64 other than the enlarged-diameter portion 64a is subjected to the frictional engagement with the outer circumferential surface of the inner tube 51, the inner-tube sleeve 64 may be connected to the inner tube 51 in a sufficiently tight manner.

As long as the protruding section 65a is formed on the annular elastic member 65 to be compressed by the step 51a of the inner tube 51 respect, a sufficient sealing may be achieved between the inner-tube sleeve 64 and the inner tube 51. For this reason, the annular elastic member 65 may be formed without the recess 65a, which provides the space for the deformation of the protruding section 65a away from the inner tube 51. In the illustrated example, the protruding section 65a is located circumferentially inward of the recess 65b, such that, as the protruding section 65a of the annular elastic member 65 is compressed, the annular elastic member 65 may be in sufficiently close contact with the outer circumferential surface of the inner tube 51, thereby enhancing the seal performance. Alternatively, the inner and outer circumferential positions where the protruding section 65a and the recess 65b are formed, respectively, may be interchanged with each other.

Figure 15:
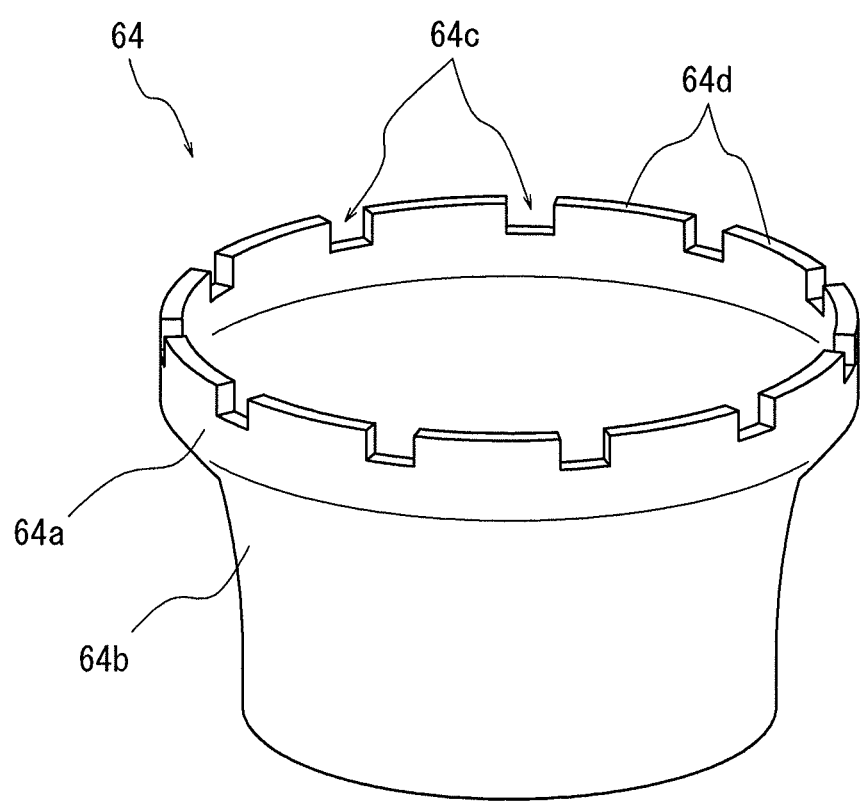
FIG. 15 is a perspective view illustrating the inner-tube sleeve taken out from the device shown in FIG. 13.

Since the annular elastic member 65 is integrally formed with the rubber body 54 fixed onto the outer circumferential surface of the inner-tube sleeve 64, it is possible to advantageously suppress the increase of the manufacturing cost due to the increase of the number of members. The annular elastic member 65 is integrally formed with the rubber body 54 in such a way that, for example, as illustrated in the perspective view of FIG. 15 showing only the inner-tube sleeve 64, the tip of the end section of the inner-tube sleeve 64 on the side of the enlarged-diameter portion 64a is provided with a plurality of cutout portions 64c, which are spaced from each other by a predetermined distance in the circumferential direction in the illustrated example, and the annular elastic member 65 and the rubber body 54 are interconnected via the cutout portions 64c.

In a case where the annular elastic member 65 is integrally formed with the rubber body 54 via the cutout portions 64c as described above, when the inner-tube sleeve 64 is in engagement with the inner tube 51 as shown in FIG. 13, the rigid portions 64d of the inner-tube sleeve 64 at its tip, other than the cutout portions 64c, may be abutted on the annular rigid member 55a of the partition wall 55 in the illustrated example. Accordingly, it is possible to always position the inner-tube sleeve 64 with respect to the annular rigid member 55a in an accurate manner at the time of mounting the inner-tube sleeve 64. Further, according to the rigid abutment, it is possible to prevent the displacement of the inner-tube sleeve 64 with respect to the inner tube 51 as the device is in use.

In order to reduce the force required to press-fit the inner-tube sleeve 64 to the outer circumferential surface of the inner tube during the assembling process of the component members of the device, it is preferable that, as shown in FIGS. 13 and 14, the portion 64b of the inner-tube sleeve 64 adjacent to the enlarged-diameter portion 64a is tapered, such that the diameter of the portion 64b gradually increases toward the partition wall 55. Even in a case where the inner-tube sleeve 64 has the aforementioned tapered shape, since the lower-end region of the inner-tube sleeve 64 as shown is in sufficient frictional engagement with the outer circumferential surface of the inner tube 51, and since the annular elastic member 65, with the protruding section 65a being compressed, is in close contact with the outer circumferential surface of the inner tube as discussed above, it is possible to positively prevent the leakage of the sealed liquid through the gap between the inner-tube sleeve 64 and the inner tube 51.

It is preferable that, the inner diameter of the annular elastic member 65 prior to being completely engaged with the inner tube 51 as shown in FIG. 14 is larger than the outer diameter of the inner tube 51. According to this configuration, the annular elastic member 65 is never rubbed on the outer circumferential surface of the inner tube 51, thereby the damaging of the annular elastic member 65 may be effectively prevented. Even in this case, since the protruding section 65a of the annular elastic member 65 is compressed by the step 51a of the inner tube 51 or the like, as shown in FIG. 13, the deformed portion of the protruding section 65a positively fills the gap between the annular elastic member 65 and the inner tube 51, thereby ensuring a seal performance of the annular elastic member 65.

Figure 16:
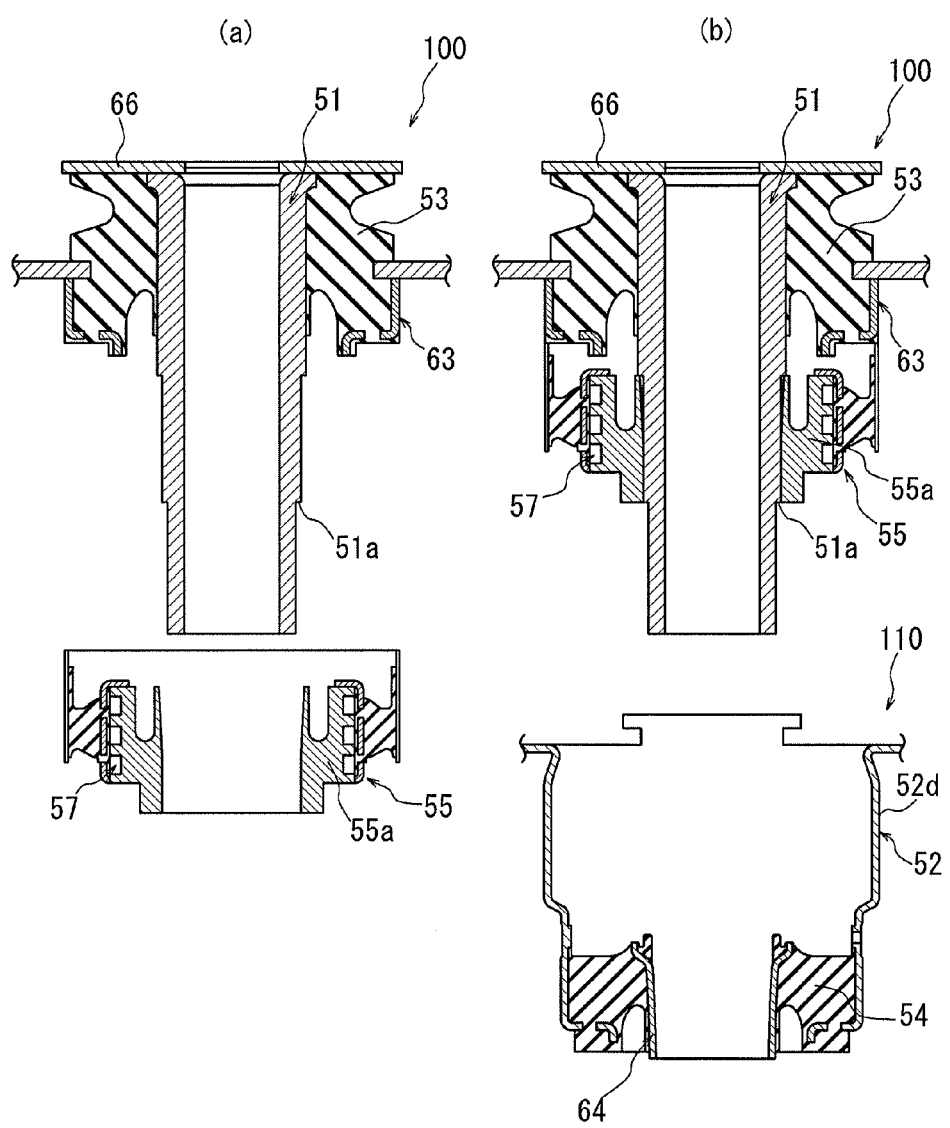
FIG. 16 is an exploded sectional view showing the steps of assembling the members of the anti-vibration device shown in FIG. 13.

When manufacturing such an anti-vibration device, the members are assembled as follows: first of all, as shown in the exploded sectional view of FIG. 16, the inner tube 51 and the intermediate tube 63 surrounding one end of the inner tube 51 are connected with each other by the rubber body 53; the annular rigid member 55a making up the inner circumferential portion of the partition wall 55 is fitted to an inner-tube-side member 100 from the other end of the inner tube 51, such that the rigid member 55a is in frictional engagement therewith around the inner tube 51, wherein the inner-tube-side member 100 is configured by integrally connecting a circular plate onto the end section of the inner tube 51 on the one end of the inner tube 51.

Subsequently, as shown in FIG. 16(b), an outer-tube-side member 110 is fitted to the outer circumferential surface of the inner tube 51 via the inner-tube sleeve 64, such that the inner-tube sleeve 64 is in frictional engagement with the inner tube 51, wherein the outer-tube-side member 110 is configured by connecting the outer circumferential surface of the inner-tube sleeve 64 and the inner circumferential surface of the outer tube 52 with each other via the rubber body 54. Lastly, an enlarged-diameter tube section 52d of the outer tube 52 is subjected to drawing for diameter reduction, thereby subjecting the enlarged-diameter tube section 52d to plastic deformation and tightly securing the intermediate tube 63 disposed on the inner circumferential side.

Figure 17:
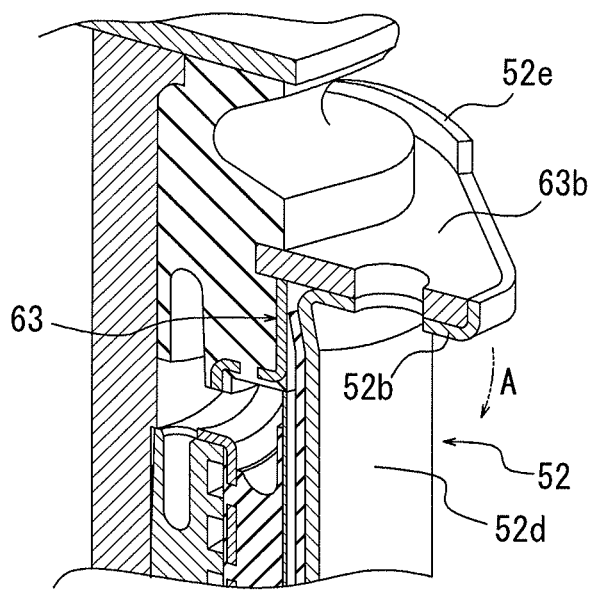
FIG. 17 is an enlarged sectional perspective view of a portion of the anti-vibration device showing in FIG. 13.
Figure 17:
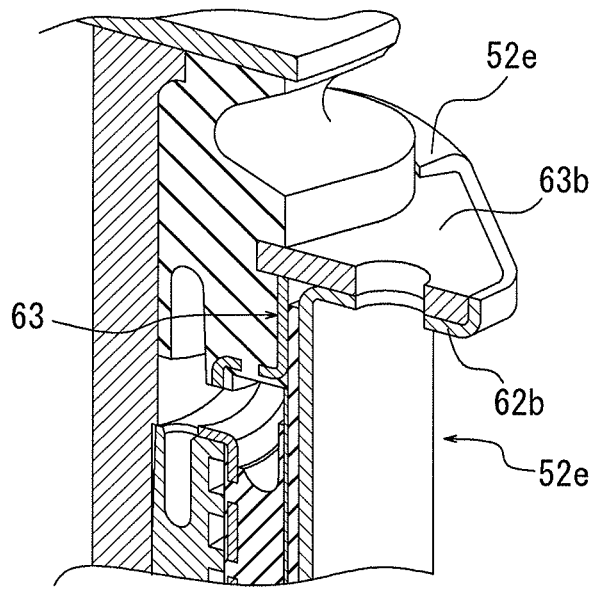

When subjecting the enlarged-diameter tube section 52d of the outer tube 52 to drawing as mentioned above, the following is preferable: as shown in FIGS. 13 and 17, the end section of the outer tube 52 on the side of the intermediate tube 63 (on the upper-end section as shown) is preliminarily formed with a flange reinforcement section 52b, which covers the lower and side surfaces of a flange 63b provided on the intermediate tube 63; prior to the drawing of the enlarged-diameter tube section 52d, as shown in the sectional perspective views of FIGS. 17(a) and 17(b), an upward sticking-out section 52e is bended over inward toward the flange 63b by means of plastic deformation, thereby fixedly sandwiching the flange 63b between the flange reinforcement section 52b and the sticking-out section 52e of the outer tube 52, wherein the sticking-out section 52e is provided on at least a portion of the side wall of the flange reinforcement section 52b.

Accordingly, it is possible to suppress the downward bending of the flange reinforcement section 52b as shown (indicated by a virtual arrow A in FIG. 17(a)) due to the drawing of the enlarged-diameter tube section 52d, and thereby the outer tube 52 may be accurately mounted at a desired position on the intermediate tube 63. As a result, the quality of the anti-vibration device may be enhanced.

EXPLANATION OF REFERENCE 1, 31, 51: Inner tube
1a: Large-diameter portion where a rubber body is fixed to
1b: Portion where a partition wall is fitted to
1c: Portion where an inner-tube sleeve is fitted to
1m, 1n: Step
2, 32, 52: Outer tube
2a: Small-diameter end section
2b: Upper-end flange
2c: Inward flange
2d: Enlarged-diameter tube section
2e: Sticking-out section
3, 4, 33, 34, 53, 54: Rubber body
3a, 4a: Annular recess
5, 35, 55: Partition wall
5a, 35a, 55a: Annular rigid member
5b, 35b, 55b: Elastic member
5c, 35c, 55c: Passage groove
5d, 35d, 55d: Seal member
5e: Tapered surface
35f: Recess
35g: Radial hole
35h: Reinforcement portion
35i: Region disposed radially outward of a recess
5j: Thin-walled section
6, 36, 66: Circumscribed rigid tube member
6a: Upper-end inward flange
6b: Lower-end inward flange
7, 37, 57: Limiting passage
8, 9, 38, 39, 58, 59: Liquid chamber
10: Support tube
11: Male member
12: Liquid injection inlet
13, 63: Intermediate tube
13a: Inward flange
13b: Flange 14, 64: Inner-tube sleeve
14a, 64a: Enlarged-diameter portion
14b, 64b: Portion adjacent to an enlarged-diameter portion
14c, 64c: Cutout portions
14d, 64d: Tip portions other than cutout portions
15, 65: Annular elastic member
16, 66; Circular plate
25a, 25b: Ring member with U-shaped cross section
25c, 25d: Rubber material

The invention claimed is:

1. A liquid-sealed anti-vibration device comprising:
an inner tube;
an outer tube;
rubber bodies interconnecting the inner and outer tubes in a liquid-tight manner at two positions spaced in an axial direction;
a partition wall disposed between the rubber bodies to divide a space between the inner and outer tubes into two chambers in the axial direction, the partition wall having an annular rigid member and an elastic member;
said two chambers each being filled with non-compressible liquid; and
a limiting passage provided in the partition wall to allow said two chambers to communicate with each other,
wherein:
the annular rigid member protrudes from the inner tube toward the outer tube or from the outer tube toward the inner tube, the elastic member connects the annular rigid member to either the outer tube or the inner tube that is on the opposite side of the side where the annular rigid member is mounted,
the limiting passage is formed by at least one passage groove, the passage groove being formed on a surface of the annular rigid member on a protruding side of the annular rigid member and extending at least one time around the annular rigid member, and by a rigid tube member fixed to the elastic member so as to close a radial opening of the passage groove via a seal member in a liquid-tight manner,
the rigid tube member for closing the radial opening of the passage groove of the limiting passage has an upper-end inward flange or an upper-end outward flange engaging with an upper-surface edge section of the annular rigid member, and
a lower-end section of the rigid tube member has an inward-flange inclined surface or an outward-flange tapered surface facing obliquely upward and engaging with a tapered surface or an inclined surface which faces obliquely downward and is provided on an outer circumferential surface or an inner circumferential surface of a lower-end section of the annular rigid member.

2. A liquid-sealed anti-vibration device according to claim 1, wherein
the upper-end inward flange or the upper-end outward flange of the rigid tube member engages with the upper-surface edge section of the annular rigid member over a width longer than a groove depth of the passage groove.

3. A liquid-sealed anti-vibration device according to claim 1,
wherein the seal member is formed as a lining layer of the elastic member, the lining layer being disposed on an inner circumferential surface of the rigid tube member or on an outer circumferential surface of the rigid tube member.

4. A liquid-sealed anti-vibration device according to claim 1, wherein
the partition wall has the annular rigid member protruding from the inner tube toward the outer tube,
the rigid tube member caps the passage groove formed on an outer circumferential surface of the annular rigid member in a liquid-tight manner and sandwiches and secures the annular rigid member between inward flanges respectively disposed on axially-opposite end portions of the rigid tube member,
the elastic member connects the rigid tube member to the outer tube,
the limiting passage of the partition wall is formed by the passage groove formed on the outer circumferential surface of the annular rigid member and the rigid tube member closing the opening of the passage groove via the seal member in a liquid-tight manner, and
the limiting passage opens to at least one of said two chambers via a through hole formed in the annular rigid member, the through hole extending in the axial direction and extending on an outer circumferential side thereof.

5. A liquid-sealed anti-vibration device according to claim 4, wherein
at least one end surface of the annular rigid member on the side of one of said two chambers is provided with at least one recess disposed radially inward of the limiting passage, the recess extending in the axial direction, and
the limiting passage opens to the at least one of said two chambers via a radial hole extending circumferentially outwardly from the recess.

6. A liquid-sealed anti-vibration device according to claim 5, wherein
the annular rigid member of the partition wall frictionally engages with an outer circumferential surface of the inner tube,
a diameter of the outer circumferential surface of the inner tube is made smaller via a flat-surfaced step at a portion where the partition wall is fitted to, the flat-surfaced step extending perpendicularly to a central axis of the inner tube, and
a section of the end surface of the annular rigid member is abutted on the step of the inner tube, the section being located radially inward of the recess.

7. A liquid-sealed anti-vibration device according to claim 1, wherein
one of the rubber bodies is fixed to an outer circumferential surface of the inner tube, which is formed of a rigid material, on one end side of the inner tube, an inner-tube sleeve, which is formed of a rigid material, is fitted to the outer circumferential surface of the inner tube on the other end of the inner tube, the other rubber body is connected to the inner tube via the inner-tube sleeve, and the annular rigid member protruding from the inner tube toward the outer tube is fitted to the outer circumferential surface of the inner tube,
an outer diameter of the inner tube is made smaller via a flat-surfaced step at a portion where the annular rigid member is fitted to, than at a portion where the one of the rubber bodies is fixed to, the flat-surfaced step extending perpendicularly to a central axis of the inner tube, and the outer diameter of the inner tube is made further smaller via a step at portion where the inner-tube sleeve is fitted to, and
an inner circumferential surface of the annular rigid member has a tapered shape, such that a diameter of the inner circumferential surface of the annular rigid member gradually increases toward the one end of the inner tube at least along an end portion of the annular rigid member on the side of the one end of the inner tube, and an inner circumferential surface of the annular rigid member frictionally engages with an outer circumferential surface of the inner tube.

8. A liquid-sealed anti-vibration device according to claim 7, wherein
a portion of the annular rigid member on the side of the inner-tube sleeve is formed with a thin-walled section having an outer diameter that is smaller than an outer diameter of the other portion of the annular rigid member,
a portion of the annular rigid member other than the thin-walled section is provided with the limiting passage, and
the annular rigid member frictionally engages with the outer circumferential surface of the inner tube, mainly at the thin-walled section.

9. A liquid-sealed anti-vibration device according to claim 7, wherein
an end surface of the annular rigid member on the side of the one end of the inner tube is formed with an annular recess dented in a direction toward the inner-tube sleeve, the annular recess extending along an entire circumference, and
the limiting passage is disposed circumferentially outward of the annular recess.

10. A liquid-sealed anti-vibration device according to claim 1, wherein
at least one of the rubber bodies is connected to an outer circumferential surface of the inner tube via the inner-tube sleeve,
a diameter of an end portion of the inner-tube sleeve on the side of the partition wall is enlarged compared to a diameter of the other portion of the inner-tube sleeve, and an annular elastic member is provided between the enlarged-diameter portion and the inner tube, the annular elastic member having a protruding section toward the partition wall and being integral with the one of the rubber bodies, and
the inner-tube sleeve frictionally engages with the outer circumferential surface of the inner tube, and the protruding section of the annular elastic member is compressed by at least one of the step provided on the outer circumferential surface of the inner tube and a portion comprised of the annular rigid member of the partition wall.

11. A liquid-sealed anti-vibration device according to claim 10, wherein the annular elastic member is provided with a recess disposed radially outward or radially inward of the protruding section, the recess extending along an entire circumference.

12. A liquid-sealed anti-vibration device according to claim 10, wherein
a tip of the end portion of the inner-tube sleeve with the enlarged diameter is provided with a plurality of cutout portions, the one of the rubber bodies and the annular elastic member being integrally connected with each other via the cutout portions, and
portions of the tip of the inner-tube sleeve other than the cutout portions are abutted on at least one of the step of the inner tube and the annular rigid member of the partition wall.

13. A method for manufacturing a liquid-sealed anti-vibration device,
the liquid-sealed anti-vibration device comprising:
an inner tube and an outer tube;
rubber bodies interconnecting the inner and outer tubes in a liquid-tight manner at two positions spaced in an axial direction;
a partition wall disposed between the rubber bodies, the partition wall dividing a space between the inner and outer tubes into two chambers in the axial direction and having an annular rigid member and an elastic member;
said two chambers each being filled with non-compressible liquid; and
a limiting passage provided in the partition wall so as to connect said two chambers with each other,
the method comprising:
mounting the annular rigid member for the partition wall around the inner tube; and
capping a passage groove formed on an outer circumferential surface of the annular rigid member by a rigid tube member via a seal member, such that an upper-end inward flange of the rigid tube engages with an upper-surface edge section of the annular rigid member, the rigid tube member being connected to the outer tube side and being fixed to an inner circumferential portion of the elastic member, and a lower-end section of the rigid tube member is subjected to plastic deformation so as to be aligned with a tapered surface facing obliquely downward which is provided on an outer circumferential surface of a lower end of the annular rigid member.

* * * * *